US012562845B2

(12) United States Patent
Jiang

(10) Patent No.: US 12,562,845 B2
(45) Date of Patent: Feb. 24, 2026

(54) COMMUNICATION METHOD, COMMUNICATION APPARATUS, AND STORAGE MEDIUM

(71) Applicant: Beijing Xiaomi Mobile Software Co., Ltd., Beijing (CN)

(72) Inventor: Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 332 days.

(21) Appl. No.: 18/273,588

(22) PCT Filed: Jan. 22, 2021

(86) PCT No.: PCT/CN2021/073330
§ 371 (c)(1),
(2) Date: Jul. 21, 2023

(87) PCT Pub. No.: WO2022/155897
PCT Pub. Date: Jul. 28, 2022

(65) Prior Publication Data
US 2024/0080137 A1 Mar. 7, 2024

(51) Int. Cl.
| *H04L 1/00* | (2006.01) |
| *H04L 1/1812* | (2023.01) |
| *H04L 1/1822* | (2023.01) |
| *H04L 1/1867* | (2023.01) |

(52) U.S. Cl.
CPC .......... *H04L 1/1812* (2013.01); *H04L 1/1822* (2013.01); *H04L 1/1887* (2013.01)

(58) Field of Classification Search
None
See application file for complete search history.

(56) References Cited

U.S. PATENT DOCUMENTS

| 10,567,110 | B2 | 2/2020 | Dinan | |
| 2012/0127938 | A1* | 5/2012 | Lv | H04W 72/12 |
| | | | | 370/329 |
| 2014/0161110 | A1* | 6/2014 | Kim | H04L 5/0028 |
| | | | | 370/336 |
| 2015/0358997 | A1 | 12/2015 | Yang et al. | |
| 2016/0323854 | A1* | 11/2016 | Gao | H04L 1/1893 |
| 2018/0014163 | A1* | 1/2018 | Herrmann | H04W 52/48 |
| 2020/0413463 | A1* | 12/2020 | Ouchi | H04W 48/16 |
| 2021/0105748 | A1* | 4/2021 | Chen | H04L 5/0094 |
| 2023/0097512 | A1* | 3/2023 | Yao | H04L 5/0053 |
| | | | | 370/329 |

(Continued)

FOREIGN PATENT DOCUMENTS

| CN | 101807983 A | 8/2010 |
| CN | 101841771 A | 9/2010 |
| CN | 102067499 A | 5/2011 |

(Continued)

*Primary Examiner* — Brandon M Renner
(74) *Attorney, Agent, or Firm* — Volpe Koenig

(57) ABSTRACT

A communication method, including: determining first information, the first information being used for indicating a hybrid automatic repeat request process used for receiving a multicast broadcast service or being used for indicating that a hybrid automatic repeat request process is not used for receiving the multicast broadcast service; and, on the basis of the first information, receiving the multicast broadcast service.

17 Claims, 9 Drawing Sheets

(56)            References Cited

U.S. PATENT DOCUMENTS

2024/0015769 A1 *   1/2024  Lei ........................ H04W 72/30

FOREIGN PATENT DOCUMENTS

| | | | |
|---|---|---|---|
| CN | 102804667 | A | 11/2012 |
| CN | 104170509 | A | 11/2014 |
| CN | 108234086 | A | 6/2018 |
| CN | 110073625 | A | 7/2019 |
| CN | 110447278 | A | 11/2019 |
| CN | 111214940 | A | 6/2020 |
| CN | 111866751 | A | 10/2020 |
| CN | 111918344 | A | 11/2020 |
| KR | 1020100071710 | A | 6/2010 |
| KR | 20110088674 | A | 8/2011 |
| WO | 2010091574 | A1 | 8/2010 |

* cited by examiner

<u>110</u>

1102

1101

Determine first information, where the first information is used for indicating a hybrid automatic repeat request (HARQ) process used for receiving a multicast broadcast service (MBS) or the first information is used for indicating that the MBS is received without the HARQ process

S11

Receive the MBS on the basis of the first information

S12

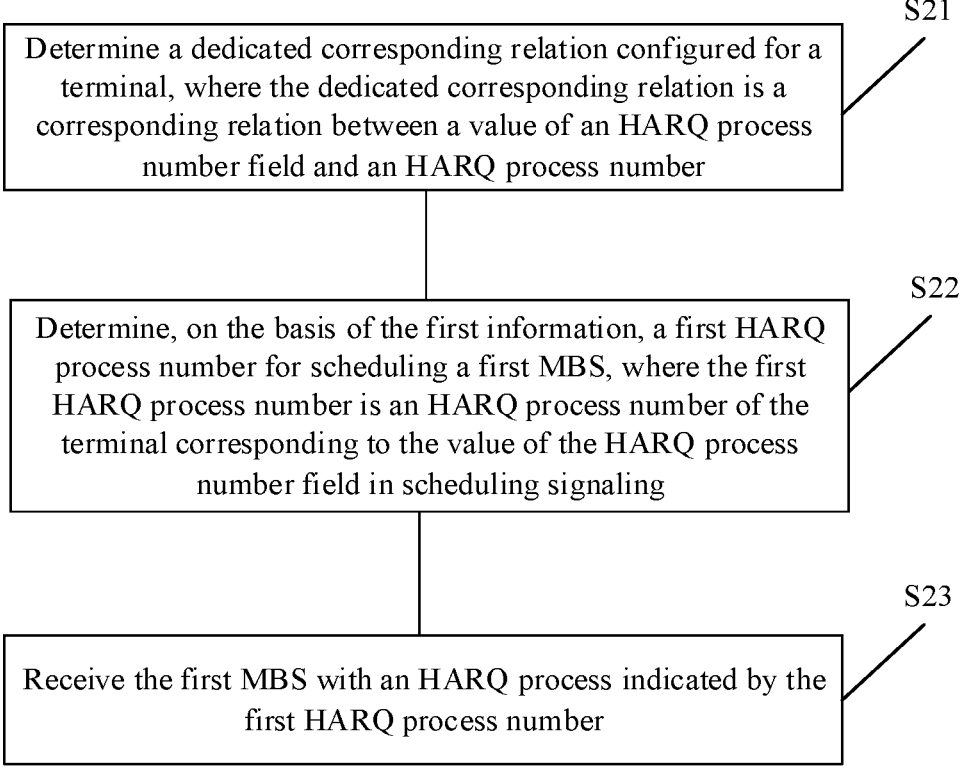

S21

Determine a dedicated corresponding relation configured for a terminal, where the dedicated corresponding relation is a corresponding relation between a value of an HARQ process number field and an HARQ process number

S22

Determine, on the basis of the first information, a first HARQ process number for scheduling a first MBS, where the first HARQ process number is an HARQ process number of the terminal corresponding to the value of the HARQ process number field in scheduling signaling

S23

Receive the first MBS with an HARQ process indicated by the first HARQ process number

Determine that an MBS is scheduled without an HARQ process

S32

Schedule the MBS without the HARQ process

S41

Determine that one or more MBSs are scheduled with a designated HARQ process

S42

Receive the MBS with the designated HARQ process in response to determining that a to-be-received MBS is scheduled with the designated HARQ process

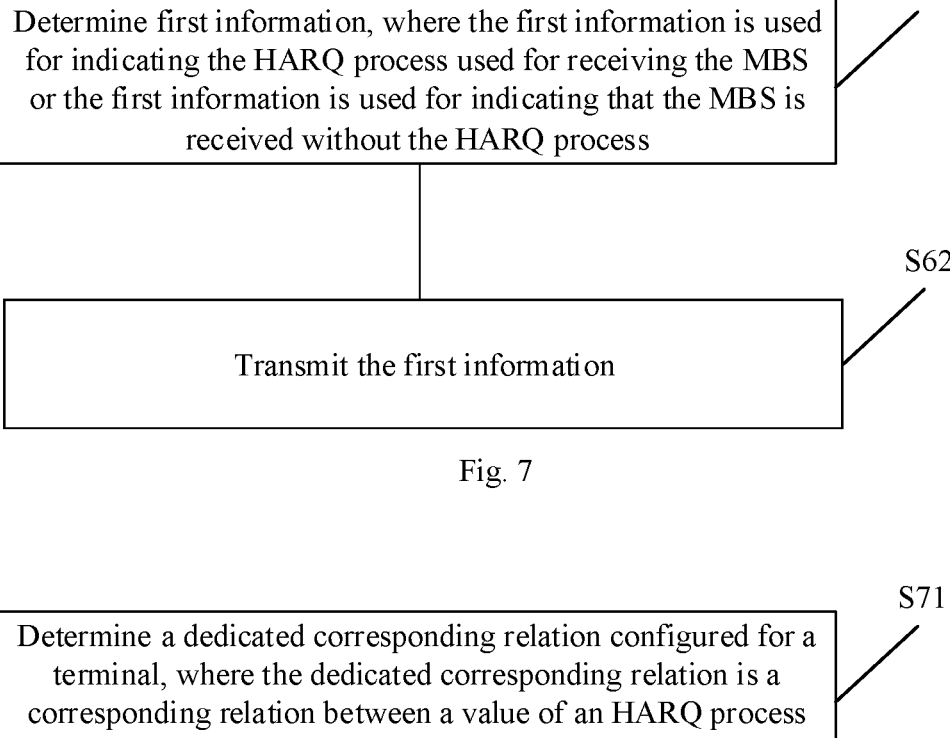

S61

Determine first information, where the first information is used for indicating the HARQ process used for receiving the MBS or the first information is used for indicating that the MBS is received without the HARQ process

S62

Transmit the first information

Determine a dedicated corresponding relation configured for a terminal, where the dedicated corresponding relation is a corresponding relation between a value of an HARQ process number field and an HARQ process number

Fig. 8

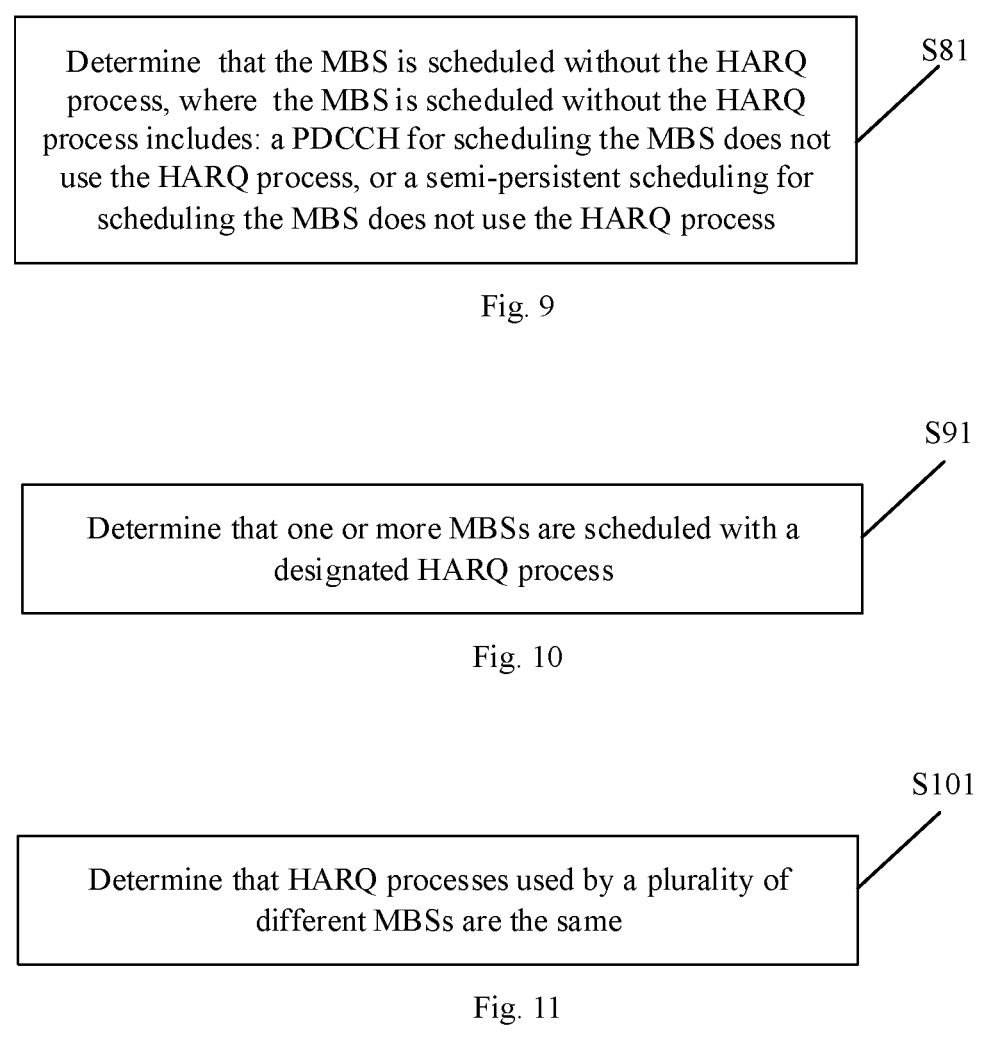

Determine that the MBS is scheduled without the HARQ process, where the MBS is scheduled without the HARQ process includes: a PDCCH for scheduling the MBS does not use the HARQ process, or a semi-persistent scheduling for scheduling the MBS does not use the HARQ process

Determine that one or more MBSs are scheduled with a designated HARQ process

Determine that HARQ processes used by a plurality of different MBSs are the same

Fig. 11

100
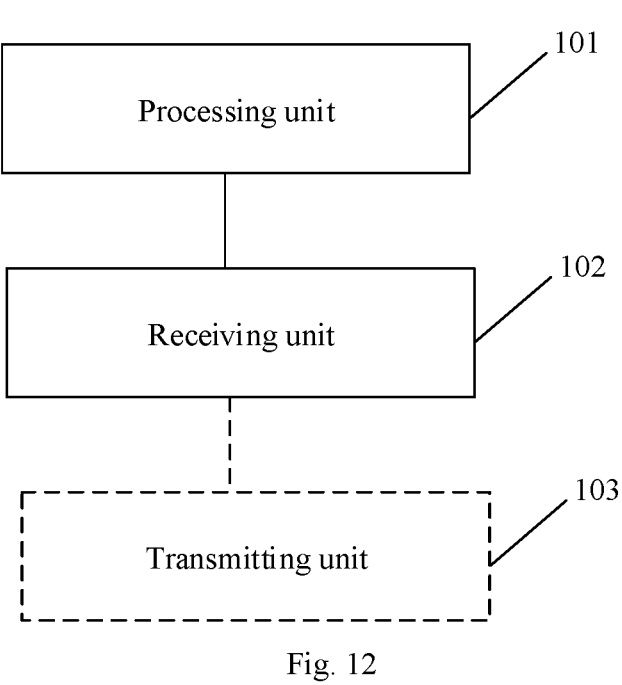
Fig. 12
200
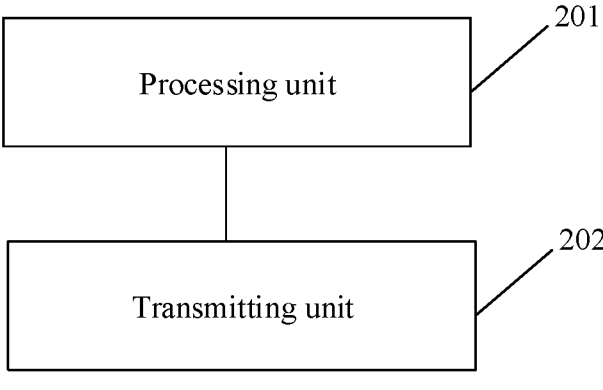
Fig. 13

<u>400</u>

COMMUNICATION METHOD, COMMUNICATION APPARATUS, AND STORAGE MEDIUM

CROSS REFERENCE TO RELATED APPLICATIONS

The present application is a U.S. National Stage of International Application No. PCT/CN2021/073330, filed on Jan. 22, 2021, the contents of all of which are incorporated herein by reference in their entirety.

BACKGROUND

Multimedia broadcast and multicast service (MBMS) or multicast broadcast service (MBS) is a type of point-to-multipoint (PTM) communication method commonly used for fifth-generation new radio (5G NR).

SUMMARY

The disclosure relates to the field of communication technologies, and particularly relates to a communication method, a communication apparatus, and a storage medium.

According to a first aspect of an example of the disclosure, a communication method is provided. The communication method is performed by a terminal and includes: determining first information, where the first information is used for indicating a hybrid automatic repeat request process used for receiving a multicast broadcast service or the first information is used for indicating that the multicast broadcast service is received without the hybrid automatic repeat request process; and receiving the multicast broadcast service on the basis of the first information.

According to a second aspect of an example of the disclosure, a communication method is provided. The communication method is performed by a network device and includes: determining first information, where the first information is used for indicating a hybrid automatic repeat request process used for receiving a multicast broadcast service or the first information is used for indicating that the multicast broadcast service is received without the hybrid automatic repeat request process; and transmitting the first information.

According to a third aspect of an example of the disclosure, a communication apparatus is provided. The communication apparatus includes: a processor; and a memory used for storing a processor-executable instruction; where the processor is configured to execute the communication method in the first aspect or any embodiment of the first aspect.

According to a fourth aspect of an example of the disclosure, a communication apparatus is provided. The communication apparatus includes: a processor; and a memory used for storing a processor-executable instruction; where the processor is configured to execute the communication method in the second aspect or any embodiment of the second aspect.

According to a fifth aspect of an example of the disclosure, a non-transitory computer-readable storage medium is provided. An instruction in the storage medium enables a mobile terminal to execute the communication method in the first aspect or any embodiment of the first aspect when executed by a processor.

According to a sixth aspect of an example of the disclosure, a non-transitory computer-readable storage medium is provided. An instruction in the storage medium enables a network device to execute the communication method in the second aspect or any embodiment of the second aspect when executed by a processor.

It should be understood that the above general description and the following detailed description are illustrative and explanatory merely, and cannot limit the disclosure.

BRIEF DESCRIPTION OF THE DRAWINGS

The accompanying drawings here are incorporated into the description as a constituent part of the description, illustrate examples conforming to the disclosure, and serve to explain principles of the disclosure along with the description.

FIG. 3 is a flow diagram of a communication method shown according to an example.

FIG. 7 is a flow diagram of a communication method shown according to an example.

FIG. 8 is a flow diagram of a communication method shown according to an example.

FIG. 9 is a flow diagram of a communication method shown according to an example.

FIG. 10 is a flow diagram of a communication method shown according to an example.

FIG. 11 is a flow diagram of a communication method shown according to an example.

FIG. 12 is a block diagram of a communication apparatus shown according to an example.

FIG. 13 is a block diagram of a communication apparatus shown according to an example.

DETAILED DESCRIPTION

Examples will be described in detail here and shown in accompanying drawings illustratively. When the following description relates to accompanying drawings, unless otherwise specified, the same numeral in different accompanying drawings denotes the same or similar element. Embodiments described in the following examples do not denote all embodiments consistent with the disclosure. On the contrary, the embodiments are merely instances of apparatuses and methods consistent with some aspects of the disclosure as detailed in the appended claims.

In the related art, data transmission of a physical downlink shared channel (PDSCH) of the MBS can support hybrid automatic repeat request (HARQ) retransmission and HARQ feedback, and a network side can simultaneously transmit a plurality of MBSs. The plurality of different MBSs is all required to support data reception and transmission of HARQ processes. In order to avoid a collision between data transmission of the plurality of different MBSs, data transmission of the different MBSs requires different HARQ processes. However, when a network device is required to transmit a large quantity of MBSs, a lack of HARQ processes will be caused, rendering data transmission unachievable. If the different MBSs are transmitted with the same HARQ process, loss during data transmission will be caused. For example, in the same HARQ process, newly transmitted data will cover previously stored old data, resulting in failure in reception of old data that is not successfully decoded yet.

Figure 1:
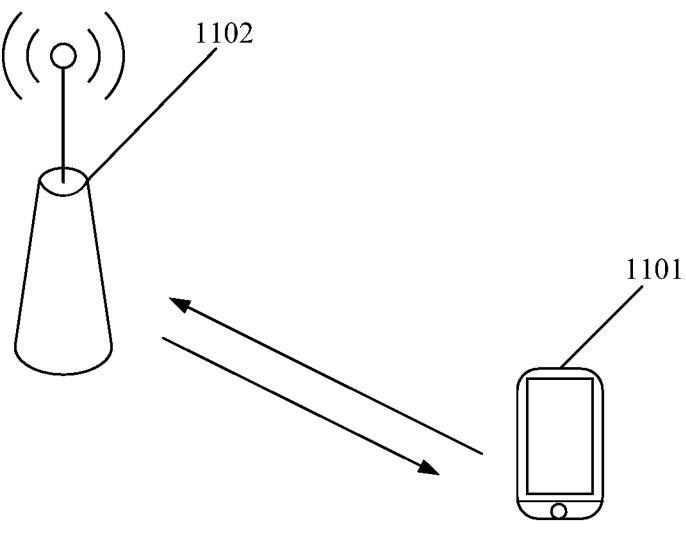
FIG. 1 is a schematic diagram of a wireless communication system shown according to an example.

A communication method provided in an example of the disclosure may be applied to a wireless communication system 110 shown in FIG. 1. With reference to FIG. 1, the wireless communication system 110 includes a terminal 1101 and a network device 1102. The terminal 1101 is connected to the network device 1102 by means of a radio resource, and transmits and receives data.

It can be understood that the wireless communication system 110 shown in FIG. 1 is merely for schematic illustration. The wireless communication system 110 may further include other network devices, such as a core network device, a wireless relay device, and a wireless backhaul device, which are not drawn in FIG. 1. The quantity of the network devices and the quantity of the terminals included in the wireless communication system 110 are not limited to examples of the disclosure.

It can be further understood that the wireless communication system 110 in an example of the disclosure is a network for providing a wireless communication function. The wireless communication system 110 may employ different communication technologies, such as code division multiple access (CDMA), wideband code division multiple access (WCDMA), time division multiple access (TDMA), frequency division multiple access (FDMA), orthogonal frequency-division multiple access (OFDMA), single carrier frequency division multiple access (SC-FDMA), and carrier sense multiple access with collision avoidance. According to capacities, speeds, delays and other factors of different networks, the networks may be divided into a 2th generation (2G) network, a 3rd generation (3G) network, a 4th (4G) network, or a future evolved network, such as a 5th (5G) network, and the 5G network may also be referred to as new radio (NR). For convenience of description, the wireless communication network may be referred to as a network for short, sometimes in the disclosure.

Further, the network device 1102 involved in the disclosure may also be referred to as a radio access network device. The radio access network device may be a base station, an evolved node B (eNB), a home base station, an access point (AP) in a wireless fidelity (WIFI) system, a wireless relay node, a wireless backhaul node, a transmission point (TP) or a transmission and reception point (TRP), etc., a generation node B (gNB) in an NR system, or an assembly or part of devices, etc. that constitute a base station. In addition, in a case of a vehicle-to-everything (V2X) communication system, the network device 1102 may be a vehicle-mounted device. It should be understood that in examples of the disclosure, specific technologies and specific device forms used for the network device 1102 are not limited.

Further, the terminal 1101 involved in the disclosure may also be referred to as a terminal device, user equipment (UE), mobile station (MS), mobile terminal (MT), etc., which is a device that provides voice and/or data connectivity for a user. For instance, the terminal 1101 may be a handheld device, a vehicle-mounted device, etc., having a wireless connection function. At present, some instances of the terminal 1101 include a mobile phone, a pocket personal computer (PPC), a palm computer, a personal digital assistant (PDA), a laptop computer, a tablet computer, a wearable device, and a vehicle-mounted device. In addition, in a case of a V2X communication system, the terminal device may be a vehicle-mounted device. It should be understood that in examples of the disclosure, specific technologies and specific device forms used for the terminal 1101 are not limited.

In the related art, the terminal and the network device interact to support a multicast broadcast service (MBS). In a 5G new radio access technology (New RAT) system, the network device may schedule transmission of MBS data through a dynamic scheduling method and/or a semi-persistent scheduling method. The dynamic scheduling method may be understood as a method to transmit data through the physical downlink control channel (PDCCH) scheduling. Semi-persistent scheduling is referred to as SPS for short.

In a case of dynamic scheduling, the MBS may be transmitted by means of a physical downlink shared channel (PDSCH) scheduled by the PDCCH. The PDCCH for scheduling the MBS may be indicated by a scheduling identity specific to the MBS. For instance, the scheduling identity specific to the MBS may be an MBS radio network temporary identity (M-RNTI).

In a case of semi-persistent scheduling, the network device configures resource allocation periods and hybrid automatic repeat request (HARQ) process numbers used in all resource allocation periods according to a radio resource control (RRC) message. The network device activates the use of a semi-persistent scheduling resource by transmitting downlink control information (DCI) signaling. For instance, from a resource position used according to an indication of a DCI activation command, 1 PDSCH resource is used for transmitting the MBS every 10 ms, a total of 4 HARQ processes are allocated for PDSCH data reception of SPS, and a start number of the allocated HARQ processes is "0". In this way, a method for allocating HARQ process numbers may be to repeatedly allocate HARQ process numbers at resource positions within a period of 10 ms in a sequence of HARQ process numbers 0/1/2/3. That is, a PDSCH of 1st SPS uses HARQ process 0, and a PDSCH of 2nd SPS uses HARQ process 1 . . . . A PDSCH of 5th SPS uses HARQ process 0 . . . .

The MBS may be marked by an "MBS identity". The MBS identity may be at least one of: a temporary mobile group identity (TMGI), an MBS session identity (ID), or an MBS quality-of-service (QoS) flow ID.

In the related art, data transmission of the PDSCH of the MBS may support HARQ retransmission and HARQ feedback. For instance, the DCI of the PDCCH indicates an HARQ process number used by data of the PDSCH. For instance, in the case of the dynamic scheduling method for the PDSCH, DCI formats used for scheduling the PDSCH include DCI format 1_0/1_1/1_2, and the DCI indicates an HARQ process number for receiving PDSCH data by a terminal. The terminal receives and decodes data using a corresponding HARQ process according to the HARQ process number indicated by the DCI. After decoding data of the HARQ process, the terminal feeds back state information of whether decoding succeeds to a network device by means of uplink control information (UCI). After receiving HARQ feedback from the terminal, the network device carries out HARQ retransmission on data that was not successfully transmitted.

However, in the related art, the terminal supports 16 HARQ processes at most, and each HARQ process is an independent buffer space used for data reception inside the terminal. The terminal puts newly received data into a buffer space of one specific HARQ process. If the terminal receives retransmission data corresponding to previously received data, the terminal combines the "previously received data" and the "retransmission data", and then puts the combined data into a buffer space of the same HARQ process for decoding. If the terminal receives new data in a case of a specific HARQ process, and the HARQ process still stores previously received old data, the terminal discards the old data in the HARQ process and puts new data into a buffer of the HARQ process. The terminal may feed back HARQ acknowledgement (ACK) (that is, decoding success) for data that is successfully received, and may feed back HARQ negative acknowledgement (NACK) (that is, decoding failure) for data that is not successfully received. For instance, at time t1, the terminal receives newly transmitted data of HARQ process-1, and stores the newly transmitted data in a buffer of HARQ process-1. At time t2, the terminal receives retransmitted data of HARQ process-1, combines the data received at time t1 and the data received at time t2, and puts the combined data into the buffer of HARQ process-1 for combined decoding. At time t3, the terminal receives newly transmitted data of HARQ process-1, discards the data received at time t1 and time t2, which are buffered in HARQ process-1, and stores the newly transmitted data received at time t3 in the buffer of HARQ process-1.

On the basis of the above HARQ communication method, when the network device transmits a plurality of MBSs, the plurality of different MBSs are all required to support data transmission and reception of HARQ processes. In order to avoid a collision between data transmission of the plurality of different MBSs, data transmission of the different MBSs requires different HARQ processes. However, when a network device is required to transmit a large quantity of MBSs, a lack of HARQ processes will be caused, rendering data transmission unachievable. If the different MBSs are transmitted with the same HARQ process, in the same HARQ process, newly transmitted data will cover previously stored old data, failure in reception of old data that is not successfully decoded will be caused, and further loss during data transmission will be caused.

In view of this, an example of the disclosure provides a communication method. In the communication method, a collision between HARQ processes is avoided as much as possible, thus reducing data loss caused by the collision between the HARQ processes.

In an embodiment, in the communication method provided in an example of the disclosure, in a case that a collision between HARQ processes cannot be avoided, through a specific processing behavior, loss during data reception can be reduced as much as possible, and a reception success rate of data having high priority is improved.

In the communication method provided in an example of the disclosure, the terminal may receive a specific MBS with a specific HARQ process, or receive a specific MBS without an HARQ process. The network device may indicate that the terminal receives a specific MBS with a specific HARQ process, or receives a specific MBS without an HARQ process.

In the communication method provided in an example of the disclosure, the terminal may receive a specific MBS with a specific HARQ process according to a rule configured by a network or specified in a protocol, or receive and transmit configuration information for a specific MBS without an HARQ process. The network device may transmit configuration information, so as to indicate that the terminal receives a specific MBS with a specific HARQ process, or receive a specific MBS without an HARQ process.

In an example of the disclosure, for convenience of description, information that is used for indicating the HARQ process used for receiving the MBS, or is used for indicating that the MBS is received without the HARQ process, is referred to as first information. The first information may be configuration information transmitted by the network device, scheduling information, or a predefined rule.

Figure 2:
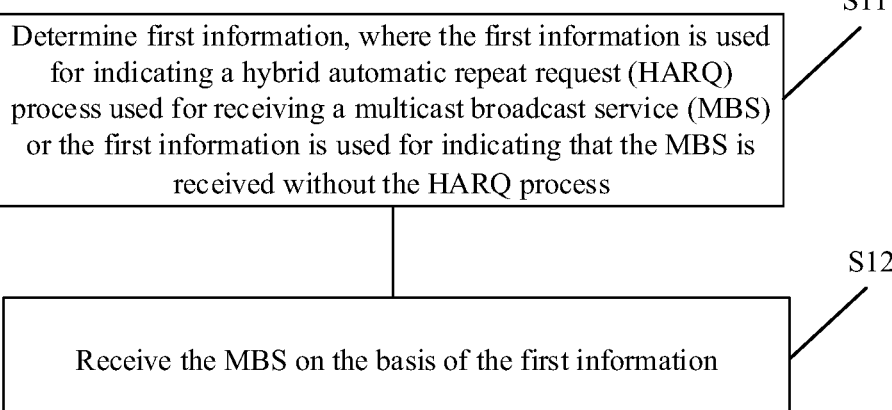
FIG. 2 is a flow diagram of a communication method shown according to an example.

FIG. 2 is a flow diagram of a communication method shown according to an example. As shown in FIG. 2, the communication method is used for a terminal and includes steps S11 and S12 as follows.

In Step S11: determine first information, where the first information is used for indicating an HARQ process used for receiving an MBS or the first information is used for indicating that the MBS is received without the HARQ process.

In Step S12: receive the MBS on the basis of the first information.

In the communication method provided in an example of the disclosure, the first information is used for indicating the HARQ process used for receiving the MBS, or the first information is used for indicating that the MBS is received without the HARQ process. Thus, by receiving the MBS on the basis of the first information, a collision between HARQ processes can be avoided to a certain extent, thus reducing data loss caused by the collision between the HARQ processes.

In the communication method provided in an example of the disclosure, in response to determining that the first information is used for indicating the HARQ process used for receiving the MBS, the first information may be a dedicated corresponding relation configured for the terminal, and the dedicated corresponding relation is a corresponding relation between a value of an HARQ process number field and an HARQ number. For instance, a corresponding relation between a code point of the HARQ process number field and the HARQ process number.

The dedicated corresponding relation may be a corresponding relation between an HARQ process number of a specific MBS configured for the terminal by a network device and a value of an "HARQ process number field" in DCI. For instance, in a case of DCI format 1_0 or 1_1, the "HARQ process number field" has 4 bits and may indicate "0" to "15" HARQ process numbers. In this way, the network device may indicate a PDCCH used for scheduling data transmission of MBS-1. For instance, in a case of a PDCCH with a scheduling identity of M-RNTI-1, values "8" to "15" of an "HARQ process number field" in DCI correspond to HARQ process numbers "0" to "7" of the terminal.

In the communication method provided in an example of the disclosure, in order to avoid a collision between HARQ processes, different dedicated corresponding relations may be configured for different terminals.

In an example, the network device may have different corresponding relations between an HARQ process number of a specific MBS and an "HARQ process number field" in DCI in cases of different terminals. Different dedicated corresponding relations are configured for different terminals, as shown in Table 1.

TABLE 1

| | An "HARQ process number field" in an M-RNTI-1 PDCCH indicates values: [0, 7]. | An "HARQ process number field" in an M-RNTI-2 PDCCH indicates values: [8, 15]. | An "HARQ process number field" in an M-RNTI-3 PDCCH indicates values: [0, 7]. |
|---|---|---|---|
| UE-1 configures corresponding HARQ process numbers: | [0, 7] | [8, 15] | |
| UE-2 configures corresponding HARQ process numbers: | | [8, 15] | [0, 7] |
| UE-3 configures corresponding HARQ process number: | [0, 7] | | [8, 15] |

In Table 1, an HARQ process number of a terminal corresponding to a value of an "HARQ process number field" in DCI in an instance is shown. The network device transmits MBS-1/2/3, and a scheduling identity corresponding to MBS-1/2/3 is M-RNTI-1/2/3. Terminal-1 is required to receive MBS-1 and MBS-2, terminal-2 is required to receive MBS-2 and MBS-3, and a protocol specifies, by default, that a value indicated by an "HARQ process number field" in an M-RNTI-1/2/3 PDCCH is an HARQ process number of a terminal. Terminal-3 is required to receive MBS-1 and MBS-3, a network device may configure and specifies that values [0, 7] indicated by an "HARQ process number field" in an M-RNTI-3 PDCCH sequentially correspond to HARQ process numbers [8, 15] of a terminal. In a case of MBS-1, the HARQ process number specified by the protocol by default is used (that is, a value indicated by an "HARQ process number field" in an M-RNTI-1PDCCH is an HARQ process number of a terminal). Through the configuration method, a collision between HARQ processes when terminal-3 receives MBS-1 and MBS-3 can be avoided.

In the communication method provided in an example of the disclosure, a specific MBS involved in a dedicated corresponding relation is marked by an "identity corresponding to an MBS". The "identity corresponding to an MBS" includes at least one of: an MBS identity or an MBS scheduling identity (for instance, M-RNTI-1).

In the communication method provided in an example of the disclosure, when receiving a specific MBS, the terminal corresponds to a value of an "HARQ process number field" in DCI corresponding to the specific MBS to an HARQ process number of the terminal, and receives data scheduled by the DCI according to the corresponding HARQ process number. For instance, as shown in Table 1, when terminal-3 receives MBS-3, in a case that a value indicated by an "HARQ process number field" in an M-RNTI-3 PDCCH is "0", the terminal receives data scheduled by scheduling DCI with HARQ process 8. When terminal-3 receives MBS-1, in a case that a value indicated by an "HARQ process number field" in an M-RNTI-1 PDCCH is "0", the terminal receives data scheduled by scheduling DCI with HARQ process 0.

In an example of the disclosure, for convenience of description, the specific MBS involved above is referred to as the first MBS, and an HARQ process number corresponding to the first MBS is referred to as the first HARQ process number.

FIG. 3 is a flow diagram of a communication method shown according to an example. As shown in FIG. 3, the communication method is used for a terminal and includes steps S21-S23 as follows.

In Step S21: determine a dedicated corresponding relation configured for the terminal, where the dedicated corresponding relation is a corresponding relation between a value of an HARQ process number field and an HARQ number.

In Step S22: determine, on the basis of the first information, a first HARQ process number for scheduling a first MBS, where the first HARQ process number is an HARQ process number of the terminal corresponding to the value of the HARQ process number field in scheduling signaling.

In Step S23: receive the first MBS with an HARQ process indicated by the first HARQ process number.

In an example of the disclosure, communication of the HARQ process of the MBS is carried out by configuring a dedicated corresponding relation for a terminal, and the HARQ process used for receiving the MBS may be configured according to the dedicated corresponding relation, so as to avoid a collision between HARQ processes, thus reducing data loss caused by the collision between the HARQ processes.

In the communication method provided in an example of the disclosure, in order to avoid data loss caused by a collision between HARQ processes, the HARQ process may not be used for a specific MBS, that is, the MBS is scheduled without the HARQ process. The MBS is scheduled without the HARQ process, which includes: a PDCCH for scheduling the MBS that does not use the HARQ process, or an SPS for scheduling the MBS that does not use the HARQ process.

In an example of the disclosure, in response to determining that the first information indicates that the MBS is scheduled without the HARQ process, the terminal receives the MBS without the HARQ process.

In the communication method provided in an example of the disclosure, an explicit indication method may be used for indicating that the MBS is scheduled without the HARQ process, and an implicit indication method may also be used for indicating that the MBS is scheduled without the HARQ process.

In an embodiment, the implicit indication method is used for indicating that the MBS is scheduled without the HARQ process, which may be to change a bit of an "HARQ process number field" in scheduling signaling for scheduling the MBS to a reserved bit. In response to determining that a bit of an "HARQ process number field" in scheduling signaling for scheduling the MBS is changed to a reserved bit, the MBS is scheduled without determining the HARQ process.

Figures 4, 5:
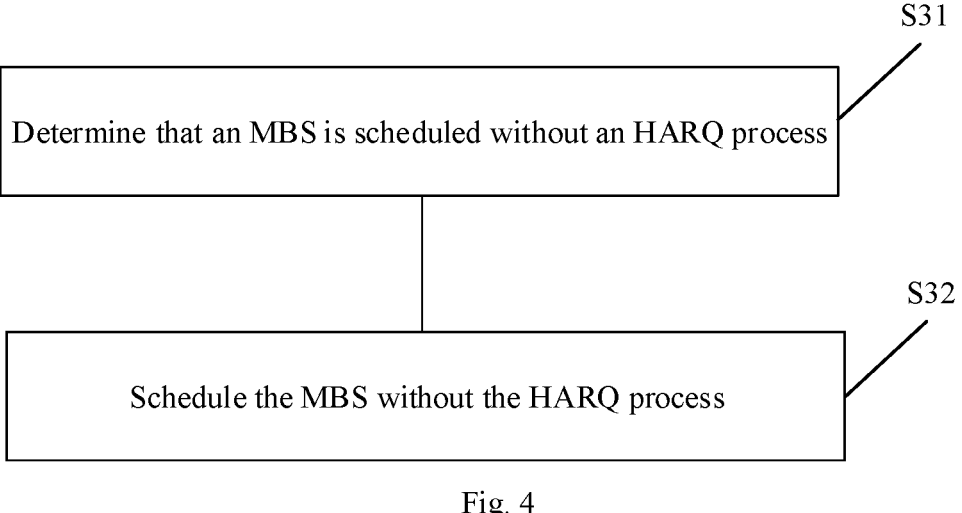
FIG. 4 is a flow diagram of a communication method shown according to an example.
FIG. 5 is a flow diagram of a communication method shown according to an example.

FIG. 4 is a flow diagram of a communication method shown according to an example. As shown in FIG. 4, the communication method is used for a terminal and includes steps S31 and S32 as follows.

In Step S31: determine that the MBS is scheduled without the HARQ process.

The MBS is scheduled without the HARQ process includes: a PDCCH for scheduling the MBS does not use the HARQ process, or a semi-persistent scheduling for scheduling the MBS does not use the HARQ process.

In an embodiment, in response to determining that a bit of an "HARQ process number field" in scheduling signaling for scheduling the MBS is changed to a reserved bit, the MBS is scheduled without the HARQ process is determined.

In Step S32: the MBS is received without the HARQ process.

In an embodiment, the first information in an example of the disclosure may be configuration information configured by a network device. The network device configures an indication of whether an HARQ process is used in a specific scheduling method for a specific MBS for the terminal. For instance, in a case of MBS-1, the network device transmits an RRC message to the terminal, and the RRC message indicates whether a bit of an "HARQ process number field" in an M-RNTI-1 PDCCH of MBS-1 is changed to a reserved bit. For instance, an "HARQ process number field" that indicates that a PDCCH is DCI format 1_0, 1_1, or 1_2 is changed to a reserved bit, and the terminal determines that data of a PDSCH of MBS-1 scheduled by the M-RNTI-1 PDCCH does not use an HARQ process. In an instance, in a case of MBS-1, the network device transmits an RRC message to the terminal, and the RRC message indicates whether SPS configuration-1 of MBS-1 uses an HARQ process. In response to determining that no HARQ process is used for SPS configuration, the terminal determines that the data of a PDSCH of MBS-1 scheduled by SPS configuration-1 does not use an HARQ process.

In the communication method provided in an example of the disclosure, in response to determining that the first information indicates that a specific MBS is scheduled without the HARQ process, the specific MBS may be marked by an "identity corresponding to an MBS". The "identity corresponding to an MBS" includes at least one of: an MBS identity or an MBS scheduling identity (for instance, M-RNTI-1).

In the communication method provided in an example of the disclosure, in response to determining that the first information indicates that a specific MBS is scheduled without the HARQ process, a scheduling method for the specific MBS includes at least one of: a dynamic scheduling method or an SPS method. In the dynamic scheduling method, the first information may be, for instance, that an M-RNTI-1 PDCCH of MBS-1 does not use an HARQ process. In the SPS method, the first information may be, for instance, that SPS configuration-1 of MBS-1 does not use an HARQ process.

In a case that the network device indicates that SPS does not use an HARQ process, data retransmission corresponding to a resource of SPS also does not use an HARQ process. For instance, SPS configuration-1 of MBS-1 does not use an HARQ process, data retransmission of SPS configuration-1 is indicated by an M-RNTI-1 PDCCH, a bit of an "HARQ process number field" in scheduling signaling of an M-RNTI-1 PDCCH is changed to a reserved bit (or is neglected).

In an example of the disclosure, in response to determining that an MBS is received, the terminal determines whether the MBS uses the HARQ process. In response to determining that the MBS uses an HARQ process, the terminal receives the MBS using an HARQ process designated by the network device. In response to determining that the MBS does not use an HARQ process, the terminal receives MBS data without any HARQ process. For instance, in cases of MBS-1 and MBS-2, in default, no specific configuration information that indicates that an HARQ process is not used is transmitted. An "HARQ process number field" in an M-RNTI PDCCH of an MBS is used for indicating an HARQ process number for receiving the MBS. The network device transmits an RRC message to the terminal, and the RRC message indicates that a bit of an "HARQ process number field" in an M-RNTI-1 PDCCH (for instance, DCI format 1_0, 1_1 or 1_2) of MBS-1 is changed to a reserved bit. In this way, when receiving M-RNTI-1 PDCCH scheduling information of MBS-1, the terminal neglects a bit corresponding to an "HARQ process number field", and receives data in a PDSCH of MBS-1 without an HARQ process. When receiving M-RNTI-2 PDCCH scheduling information of MBS-2, the terminal receives data in a PDSCH of MBS-2 with an HARQ process indicated by an "HARQ process number field" in the M-RNTI-2 PDCCH scheduling information.

In an instance, in a case of MBS-1, a network side configures SPS configuration-1 used for scheduling PDSCH data of MBS-1, SPS configuration-1 indicates that 4 consecutively numbered HARQ processes are used, a start number of the 4 consecutively numbered HARQ processes is 4, an activation command for activating a resource of SPS configuration-1 is M-RNTI-1 PDCCH, and/or a command used for indicates data retransmission corresponding to the resource of SPS configuration-1 is M-RNTI-1 PDCCH. In a case of MBS-2, the network device configures SPS configuration-2 used for scheduling PDSCH data of MBS-2, but does not configure an HARQ process used by MBS-2, an activation command for activating a resource of SPS configuration-2 is M-RNTI-2 PDCCH, and/or a command used for indicating data retransmission corresponding to the resource of SPS configuration-2 is M-RNTI-2 PDCCH. In this way, when receiving MBS-1 by means of a resource designated by SPS configuration-1, the terminal receives data in a PDSCH of MBS-1 according to an HARQ process number designated by SPS configuration-1. When the network device schedules data retransmission corresponding to a resource of SPS configuration-1 by means of an M-RNTI-1 PDCCH, an "HARQ process number field" in M-RNTI-1 PDCCH retransmission scheduling signaling indicates an HARQ process number that is required to carry out data retransmission. When receiving MBS-2 by means of a resource designated by SPS configuration-2, the terminal receives data in a PDSCH of MBS-2 by means of a resource of SPS configuration-2 without any HARQ process. Moreover, when the network device schedules data transmission corresponding to a resource of SPS configuration-2 by means of an M-RNTI-2 PDCCH, the terminal determines that a bit of an "HARQ process number field" in M-RNTI-2 PDCCH retransmission scheduling signaling is a reserved bit, that is, the bit corresponding to the "HARQ process number field" is neglected.

In the communication method provided in an example of the disclosure, the first information indicates that a specific MBS is scheduled without the HARQ process. When receiving the specific service, the terminal may neglect an "HARQ process number" field in DCI (for instance, a bit corresponding to an "HARQ process number" field is a reserved bit), and directly decodes received MBS data without any HARQ buffer, so as to avoid a collision between HARQ processes, thus reducing data loss caused by the collision between the HARQ processes.

In the communication method provided in an example of the disclosure, in response to determining that the first information is used for indicating the HARQ process used for receiving the MBS, the first information may be used for indicating that one or more MBSs are scheduled with a designated HARQ process. For instance, the network device configures an indication of one or more MBSs that use one designated HARQ process. That is, PDSCHs of the one or more MBSs all use the same HARQ process. The MBS may still support HARQ features (for instance, HARQ repetition feature), so as to improve the reliability of MBS transmission. However, every time the terminal receives one piece of newly scheduled MBS data, old data in the HARQ process is covered. Thus, in a case of a relatively small quantity of HARQ processes, part of the HARQ functions can still be used, so as to improve the reliability of data transmission. When receiving a specific MBS, the terminal determines whether the MBS uses a specific HARQ process. In response to determining that the MBS uses the specific HARQ process, the terminal receives the MBS with a specific HARQ process.

FIG. 5 is a flow diagram of a communication method shown according to an example. As shown in FIG. 5, the communication method is used for a terminal and includes steps S41 and S42 as follows.

In Step S41: determine that one or more MBSs are scheduled with a designated HARQ process.

In Step S42: receive the MBS with the designated HARQ process in response to determining that a to-be-received MBS is scheduled with the designated HARQ process.

In an example of the disclosure, the designated HARQ process may be an HARQ process configured by the network device or an HARQ process specified in a protocol.

In an embodiment, the designated HARQ process is different from an HARQ process for scheduling a unicast service, so as to avoid a collision between the HARQ processes of the MBS and the HARQ process of the unicast service.

In an instance, a total of 16 HARQ processes can be used for unicast data scheduling of the terminal, that is, HARQ processes are numbered 0 to 15. The network device configures the use of HARQ process 0 for M-RNTI-1 PDCCH scheduling of MBS-1 and M-RNTI-2 PDCCH scheduling of MBS-2, or the network device configures an indication of the use of HARQ process-M for M-RNTI-1 PDCCH scheduling of MBS-1 and M-RNTI-2 PDCCH scheduling of MBS-2. HARQ process-M is an HARQ process dedicated for receiving an MBS specified in a protocol, that is, the terminal further has HARQ process-M used for receiving an MBS in addition to 16 HARQ processes used for receiving unicast data. HARQ process-M is different from the 16 HARQ processes used for receiving unicast data, such that a collision between the HARQ process of the MBS and the HARQ process of the unicast service can be avoided, the unicast service and the MBS can be completely isolated from each other, and a buffer space of the HARQ can be increased.

In the communication method provided in an example of the disclosure, in response to determining that the first information indicates that one or more specific MBSs are scheduled with a designated HARQ process, a scheduling method for the specific MBS includes at least one of: a dynamic scheduling method or an SPS method.

In a case that the network device indicates that a specific HARQ process is used for an MBS scheduled through SPS, the specific HARQ process is also used for data retransmission corresponding to a resource scheduled through SPS. For instance, SPS configuration-1 of MBS-1 uses HARQ process-M, data retransmission of SPS configuration-1 is indicated by an M-RNTI-1 PDCCH, a bit of an "HARQ process number field" in M-RNTI-1 PDCCH scheduling signaling is changed to a reserved bit (or is neglected), and the terminal receives retransmitted data with HARQ process-M.

In the communication method provided in an example of the disclosure, in a case that a collision between HARQ processes cannot be avoided, through a specific processing behavior, loss during data reception is reduced as much as possible, and a reception success rate of data having higher priority is increased.

In an embodiment, the first information indicates that HARQ processes used by a plurality of different MBSs are the same.

Figure 6:
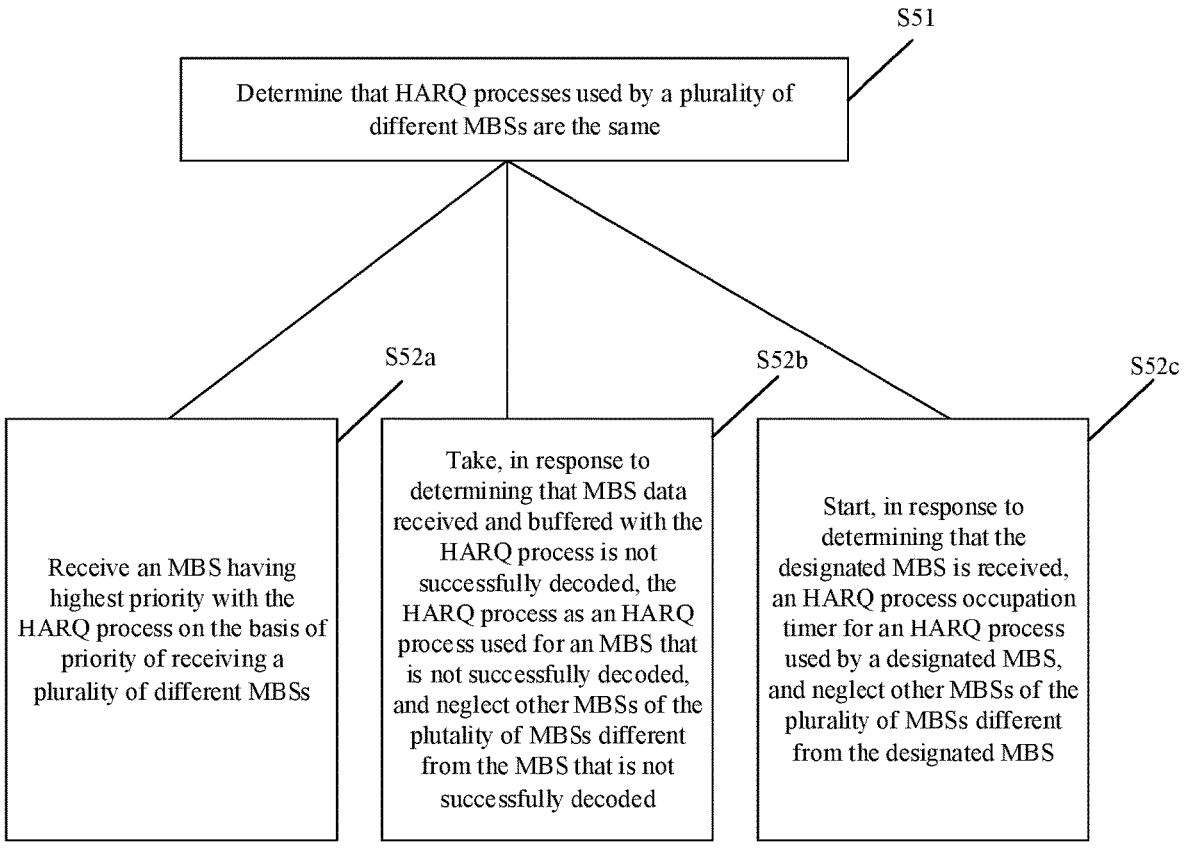
FIG. 6 is a flow diagram of a communication method shown according to an example.

FIG. 6 is a flow diagram of a communication method shown according to an example. As shown in FIG. 6, the communication method is used for a terminal and includes steps S51, S52a, S52b, and S52c as follows.

In Step S51: determine that HARQ processes used by a plurality of different MBSs are the same.

In response to determining that HARQ processes used by a plurality of different MBSs are the same, the MBS may be received through at least one of: steps S52a, S52b, or S52c.

In Step S52a: receive an MBS having the highest priority with the HARQ process on the basis of priority of receiving the plurality of different MBSs.

In Step S52b: take, in response to determining that MBS data received and buffered with the HARQ process is not successfully decoded, the HARQ process as an HARQ process used for an MBS that is not successfully decoded, and neglect other MBSs of the plurality of MBSs different from the MBS that is not successfully decoded.

In Step S52c: start, in response to determining that the designated MBS is received, an HARQ process occupation timer for an HARQ process used by a designated MBS, and neglect other MBSs of the plurality of MBSs different from the designated MBS.

In the communication method provided in an example of the disclosure, the first indication information may be indication information transmitted by the network device. For instance, the network device may indicate the use of the same HARQ process for data transmission of a plurality of different specific MBSs. For instance, the network device indicates use of HARQ process-1 for an "HARQ process number field" in an M-RNTI-1 PDCCH of MBS-1, and indicates use of HARQ process-1 for an "HARQ process number field" in an M-RNTI-2 PDCCH of MBS-2. Alternatively, for instance, SPS configuration-1 of MBS 1 uses HARQ process-1/2/3, and SPS configuration-2 of MBS 2 uses HARQ process-1/2/3.

In the communication method provided in an example of the disclosure, in response to determining that HARQ processes used by different MBSs are the same, the terminal processes data of the HARQ process according to a rule configured by a network or specified in a protocol. The rule includes any one of the following Rules 1-3.

Rule 1: according to the priority of the MBS received by the terminal, in response to determining that a collision between HARQ processes occurs, the HARQ process is used for receiving data of the MBS having high priority. For instance, the terminal simultaneously receives MBS-1 and MBS-2, but the terminal considers that service data-1 is more important (that is, has higher priority) according to the interest (for instance, a reception reliability requirement of service data or a delay requirement of the service data) of the terminal. In this way, when the network device simultaneously schedules MBS-1 and MBS-2 with HARQ process-1, the terminal uses HARQ process-1 used for data reception of MBS-1.

Rule 2: in response to determining that the same HARQ process is used for data transmission of different MBSs, and previously stored data of the MBS is not successfully decoded, the HARQ process is not used for data reception of other MBSs. That is, after data stored in the HARQ process is successfully decoded, the HARQ process can be used for data reception of other MBSs. For instance, the terminal simultaneously receives MBS-1 and MBS-2. At time t1, the terminal receives data-1 of MBS-1 with HARQ process-1, but data-1 buffered in HARQ process-1 is not successfully decoded. At time t2, the terminal receives M-RNTI-2 PDCCH scheduling of MBS-2, and also receives data-2 of MBS-2 with HARQ process-1. In this way, the terminal receives data-2 without HARQ process-1 (for instance, the terminal neglects reception of a PDSCH indicated by M-RNTI-2 PDCCH scheduling). Further, the terminal feeds back HARQ NACK (that is, decoding failure) for data-2.

Rule 3: after receiving data of a specific MBS, the terminal starts an HARQ process occupation timer for an HARQ process corresponding to the data, and the HARQ process is not used for data reception of other MBSs during operation of the timer. For instance, the terminal receives MBS-1 and MBS-2. At time t1, the terminal receives data-1 of MBS-1 with HARQ process-1, but data-1 buffered in HARQ process-1 is not successfully decoded, and the terminal starts an HARQ process occupation timer corresponding to HARQ process-1. At time t1, during operation of the HARQ process occupation timer corresponding to HARQ process-1, the terminal receives M-RNTI-2 PDCCH scheduling of MBS-2, and receives data-2 of MBS-2 also with HARQ process-1. In this way, the terminal receives data-2 without HARQ process-1 (for instance, the terminal neglects reception of a PDSCH indicated by M-RNTI-2 PDCCH scheduling). Further, the terminal feeds back HARQ NACK (that is, decoding failure) for data-2.

Furthermore, in the communication method provided in an example of the disclosure, in response to determining that the first information indicates that HARQ processes used by a plurality of different MBSs are the same, and first MBS data stored in an HARQ buffer for buffering MBS data is covered with second MBS data, data reception state feedback information is transmitted. The data reception state feedback information indicates that the first MBS data is successfully decoded. Alternatively, in response to determining that the first MBS data stored in the HARQ buffer for buffering MBS data is covered with second MBS data, reception state feedback information of the first MBS data is not transmitted. That is, in response to determining that the first MBS data stored in the HARQ buffer is covered with second MBS data, the UE does not transmit data reception state feedback information for a reception state of the covered first MBS data, or the data reception state feedback information for the covered first MBS data is successfully decoded. Through the communication method, ineffective retransmission can be avoided.

For instance, the network device configures the transmission of HARQ feedback information for a data receiving terminal of MBS-1. HARQ process-1 stores data of MBS-1, and the data is not successfully decoded. In this case, the network device schedules data of MBS-2 with HARQ process-1, such that MBS data-1 stored in HARQ process-1 is covered with MBS data-2. In this case, the terminal cannot recover MBS data-1 through HARQ retransmission. In this way, the terminal does not transmit HARQ feedback corresponding to MBS data-1, or HARQ feedback corresponding to MBS data-1 indicates decoding success (that is, HARQ ACK).

In the communication method provided in an example of the disclosure, data reception state feedback information that indicates decoding failure is transmitted for a neglected MBS, such that in a case that new data is not stored in an HARQ buffer, original data can use a new HARQ process for communication after new data is successfully transmitted. For instance, in a case of rule 2 and/or rule 3, when the terminal transmits data reception state feedback information for neglected MBS data, the data reception state feedback information is decoding failure.

In the communication method provided in an example of the disclosure, the HARQ process occupation timer may be started according to at least one of the cases. After MBS data of a designated MBS is received, the HARQ process occupation timer is started; after the MBS data of the designated MBS is received, and in a case that the MBS data is not successfully decoded, the HARQ process occupation timer is started; after MBS data of the designated MBS is received and feedback information of the MBS data is transmitted, the HARQ process occupation timer is started. After the MBS data of the designated MBS is received and the feedback information of the MBS data is transmitted, and in a case that the feedback information is not successfully decoded, the HARQ process occupation timer is started.

For instance, in a case of the above rule 3, a start event of the HARQ process occupation timer includes any one of the events as follows.

After MBS data is received, the HARQ process occupation timer is started. For instance, the terminal starts the HARQ process occupation timer at PDSCH reception end time t1 of data-1 of MBS-1.

After the MBS data is received, and in the case that the MBS data is not successfully decoded, the HARQ process occupation timer is started. For instance, after the terminal receives a PDSCH of data-1 of MBS-1, and in a case that data-1 is not successfully decoded, the HARQ process occupation timer is started.

After the MBS data is received and feedback information of the MBS data is transmitted, the HARQ process occupation timer is started. For instance, after the terminal receives a PDSCH of data-1 of MBS-1, the terminal starts the HARQ process occupation timer at transmission end time t2 of the feedback information of data-1.

After the MBS data is received and the feedback information of the MBS data is transmitted, and in a case that the feedback information is not successfully decoded, the HARQ process occupation timer is started. For instance, after the terminal receives a PDSCH of data-1 of MBS-1, and in a case that data-1 is not successfully decoded, the terminal starts the HARQ process occupation timer at transmission end time t2 of the feedback information of data-1.

In the communication method provided in an example of the disclosure, the HARQ process occupation timer may be stopped according to at least one of cases: an MBS having higher priority than a designated MBS is received; MBS data of the designated MBS is successfully decoded; or the MBS data of the designated MBS is successfully decoded, and feedback information of the MBS data is transmitted.

For instance, in a case of rule 3, a stop event of the HARQ process occupation timer includes any one of the events as follows.

Data of a service having a higher priority is received. For instance, HARQ process-1 of the terminal stores data-1 of MBS-1, and the HARQ process occupation timer of HARQ process-1 of the terminal operates. In this case, the terminal receives scheduling information of data-2 of MBS-2, and MBS-2 has a higher priority than MBS-1 (for instance, priority is determined according to the receiving interest of the terminal for different MBSs). In this way, the terminal stops the HARQ process occupation timer. In this way, HARQ process-1 is used for receiving data-2 of MBS-2.

Data stored in an HARQ process corresponding to the HARQ process occupation timer is successfully decoded. For instance, HARQ process-1 of the terminal stores data-1 of MBS-1, data-1 is not successfully decoded, and a HARQ process occupation timer of HARQ process-1 of the terminal operates. In this case, the terminal receives retransmission of data-1 of MBS-1, and after being combined and decoded by means of an HARQ, data-1 is successfully decoded, and the terminal stops the HARQ process occupation timer of HARQ process-1.

Data stored in an HARQ process corresponding to the HARQ process occupation timer is successfully decoded, and the terminal transmits feedback information of the MBS data. For instance, HARQ process-1 of the terminal stores data-1 of MBS-1, and data-1 is not successfully decoded, and a HARQ process occupation timer of HARQ process-1 of the terminal operates. In this case, the terminal receives retransmission of data-1 of MBS-1, and after being combined and decoded by means of an HARQ, data-1 is successfully decoded. In this way, after transmitting HARQ ACK feedback of data-1, the terminal stops the HARQ process occupation timer of HARQ process-1.

According to the communication method provided in an example of the disclosure, when the terminal simultaneously receives a plurality of MBSs, a collision between HARQ processes can be avoided as much as possible, thus reducing data loss caused by the collision between the HARQ processes. Moreover, in an extreme case where a collision between HARQ processes cannot be avoided, through a specific processing behavior, loss during data reception can be reduced as much as possible, and a reception success rate of data having high priority is increased.

In the communication method provided in an example of the disclosure, the network device may indicate that the terminal receives a specific MBS with a specific HARQ process, or receives the specific MBS without an HARQ process.

FIG. 7 is a flow diagram of a communication method shown according to an example. As shown in FIG. 7, the communication method is used for a network device and includes steps S61 and S62 as follows.

In Step S61: determine first information, where the first information is used for indicating an HARQ process used for receiving an MBS, or the first information is used for indicating that the MBS is received without the HARQ process.

In Step S62: transmit the first information.

In the communication method provided in an example of the disclosure, the first information indication may be used for indicating a dedicated corresponding relation configured for the terminal.

FIG. 8 is a flow diagram of a communication method shown according to an example. As shown in FIG. 8, the communication method is used for a network device and includes step S71 as follows.

In Step S71: determine a dedicated corresponding relation configured for the terminal, where the dedicated corresponding relation is a corresponding relation between a value of an HARQ process number field and an HARQ process number.

In an embodiment, different terminals have different dedicated corresponding relations.

In the communication method provided in an example of the disclosure, the first information indication may be used for indicating that the MBS is scheduled without the HARQ process.

FIG. 9 is a flow diagram of a communication method shown according to an example. As shown in FIG. 9, the communication method is used for a network device and includes step S81 as follows.

In Step S81: determine that the MBS is scheduled without the HARQ process, where the MBS is scheduled without the HARQ process includes: a PDCCH for scheduling the MBS that does not use the HARQ process, or a semi-persistent scheduling for scheduling the MBS that does not use the HARQ process.

In an embodiment, a bit of the HARQ process number field in scheduling signaling for scheduling the MBS is a reserved bit, which can be understood as an implicit indication that the MBS is scheduled without the HARQ process.

In the communication method provided in an example of the disclosure, the first information indication may be used for indicating that one or more MBSs are scheduled with a designated HARQ process.

FIG. 10 is a flow diagram of a communication method shown according to an example. As shown in FIG. 10, the communication method is used for a network device and includes step S91 as follows.

In Step S91: determine that one or more MBSs are scheduled with a designated HARQ process.

In an embodiment, the designated HARQ process is different from an HARQ process for scheduling a unicast service.

In the communication method provided in an example of the disclosure, the first information indication may be used for indicating that HARQ processes used by a plurality of different MBSs are the same.

FIG. 11 is a flow diagram of a communication method shown according to an example. As shown in FIG. 11, the communication method is used for a network device and includes step S101 as follows.

In Step S101: determine that HARQ processes used by a plurality of different MBSs are the same.

It can be understood that in an example of the disclosure, first information involved in an HARQ process communication process of carrying out an MBS by a network device through the above communication method is the same as or similar to first information involved in an HARQ process communication process of carrying out an MBS by a terminal through the above communication method, and will not be described in detail here in an example of the disclosure.

It can be understood that the communication method applied to the network device provided in an example of the disclosure is similar to that applied to the terminal, and similarities will not be repeated here.

It can be further understood that the communication method provided in an example of the disclosure may be applied to an implementation process in which the terminal and the network device interact to implement the HARQ process communication of an MBS. In the method in which the terminal and the network device interact to implement the HARQ process communication of an MBS, the terminal and the network device are provided with relevant functions in the above examples separately, which will not be repeated here.

Those skilled in the art can understand that various embodiments involved in examples of the disclosure or examples can be used in combination with the foregoing examples, or can be used independently. Whether the embodiments or examples are used independently or in combination with the foregoing examples, their implementation principles are similar to each other. During the implementation of the disclosure, some examples are described by means of embodiments used together. Certainly, those skilled in the art can understand that such illustrations are not intended to limit examples of the disclosure.

On the basis of the same concept, an example of the disclosure further provides a communication apparatus.

It can be understood that in order to implement the above functions, the communication apparatus provided in an example of the disclosure includes corresponding hardware structures and/or software modules for executing all functions. Examples of the disclosure, in combination with various illustrative units and algorithm steps disclosed in the examples of the disclosure, can be implemented in the form of hardware or a combination of hardware and computer software. Whether a certain function is executed by means of hardware or by driving hardware by computer software depends on specific application and design constraint conditions of technical solutions. Those skilled in the art can implement the described functions through different methods for each particular application, but such implementation should not be considered beyond the scope of the technical solutions of examples of the disclosure.

FIG. 12 is a block diagram of a communication apparatus 100 shown according to an example. With reference to FIG. 12, a communication apparatus 100 is performed by a terminal and includes a processing unit 101 and a receiving unit 102.

The processing unit 101 is configured to determine first information, where the first information is used for indicating an HARQ process used for receiving an MBS, or the first information is used for indicating that the MBS is received without the HARQ process. The receiving unit 102 is configured to receive the MBS on the basis of the first information.

In an embodiment, the processing unit 101 determines the first information through a method as follows: determine a dedicated corresponding relation configured for the terminal, where the dedicated corresponding relation is a corresponding relation between a value of an HARQ process number field and an HARQ process number.

The receiving unit 102 receives the MBS on the basis of the first information through a method as follows: determine, on the basis of the first information, a first HARQ process number for scheduling a first MBS, where the first HARQ process number is an HARQ process number of the terminal corresponding to the value of the HARQ process number field in scheduling signaling; and receive the first MBS with an HARQ process indicated by the first HARQ process number.

In an embodiment, different terminals have different dedicated corresponding relations.

In an embodiment, the processing unit 101 determines the first information through a method as follows: determine that the MBS is scheduled without the HARQ process, where the MBS is scheduled without the HARQ process includes: a physical downlink control channel for scheduling the MBS that does not use the HARQ process, or a semipersistent scheduling for scheduling the MBS does not use the HARQ process.

The receiving unit 102 receives the MBS through a method as follows: receives the MBS without the HARQ process.

In an embodiment, the processing unit 101 determines that the MBS is received without the HARQ process through a method as follows: determine, in response to determining that a bit of an HARQ process number field in scheduling signaling for scheduling the MBS is a reserved bit, that the MBS is scheduled without the HARQ process.

In an embodiment, the processing unit 101 determines the first information through a method as follows: determine that one or more MBSs are scheduled with a designated HARQ process.

The receiving unit 102 receives the MBS on the basis of the first information through a method as follows: receive the MBS with the designated HARQ process in response to determining that a to-be-received MBS is scheduled with a designated HARQ process.

In an embodiment, the designated HARQ process is different from an HARQ process for scheduling a unicast service.

In an embodiment, the processing unit 101 determines the first information through a method as follows: determine that the HARQ processes used by a plurality of different MBSs are the same.

The receiving unit 102 receives the MBS through at least one of methods: receive an MBS having highest priority with the HARQ process on the basis of priority of receiving a plurality of different MBSs; take, in response to determining that MBS data received and buffered with the HARQ process is not successfully decoded, the HARQ process as an HARQ process used for an MBS that is not successfully decoded, and neglect other MBSs of the plurality of MBSs different from the MBS that is not successfully decoded; or start, in response to determining that the designated MBS is received, an HARQ process occupation timer for an HARQ process used by a designated MBS, and neglect other MBSs of the plurality of MBSs different from the designated MBS.

In an embodiment, the communication apparatus 100 further includes a transmitting unit 103. The transmitting unit 103 is configured to: transmit data reception state feedback information in response to determining that first MBS data stored in an HARQ buffer for buffering MBS data is covered with second MBS data, where the data reception state feedback information indicates that first MBS data is successfully decoded, or not transmit reception state feedback information of the first MBS data.

In an embodiment, the communication apparatus 100 further includes a transmitting unit 103. The transmitting unit 103 is configured to: transmit data reception state feedback information that indicates decoding failure for other neglected MBSs.

In an embodiment, the HARQ process occupation timer is started according to at least one of cases: after MBS data of a designated MBS is received, the HARQ process occupation timer is started. After the MBS data of the designated MBS is received, and in the case that the MBS data is not successfully decoded, the HARQ process occupation timer is started. After the MBS data of the designated MBS is received and feedback information of the MBS data is transmitted, the HARQ process occupation timer is started. After the MBS data of the designated MBS is received and the feedback information of the MBS data is transmitted, and in a case that the feedback information is not successfully decoded, the HARQ process occupation timer is started.

In an embodiment, the receiving unit 102 is further configured to stop the HARQ process occupation timer according to at least one of the following cases: an MBS having a higher priority than the designated MBS is received. The MBS data of the specified MBS is successfully decoded. The MBS data of the designated MBS is successfully decoded, and the feedback information of the MBS data is transmitted.

FIG. 13 is a block diagram of a communication apparatus 200 shown according to an example. With reference to FIG.

13, a communication apparatus 200 is performed by a network device and includes a processing unit 201 and a transmitting unit 202.

The processing unit 201 is configured to determine first information, where the first information is used for indicating an HARQ process used for receiving the MBS, or the first information is used for indicating that the MBS is received without the HARQ process. The transmitting unit 202 is configured to transmit the first information.

In an embodiment, the processing unit 201 determines the first information through a method as follows: determine a dedicated corresponding relation configured for the terminal, where the dedicated corresponding relation is a corresponding relation between a value of an HARQ process number field and an HARQ process number.

In an embodiment, different terminals have different dedicated corresponding relations.

In an embodiment, the processing unit 201 determines the first information through a method as follows: determine that the MBS is scheduled without the HARQ process, where the MBS is scheduled without the HARQ process includes: a PDCCH for scheduling the MBS does not use the HARQ process, or a semi-persistent scheduling for scheduling the MBS does not use the HARQ process.

In an embodiment, a bit of the HARQ process number field in scheduling signaling for scheduling the MBS is a reserved bit.

In an embodiment, the processing unit 201 determines the first information through a method as follows: determine that one or more MBSs are scheduled with a designated HARQ process.

In an embodiment, the designated HARQ process is different from an HARQ process for scheduling a unicast service.

In an embodiment, the processing unit 201 determines the first information through a method as follows: determine that the HARQ processes used by a plurality of different MBSs are the same.

In the apparatus in the above example, a specific method for executing an operation by each module is described in detail in an example relating to the method, and will not be described in detail here.

Figure 14:
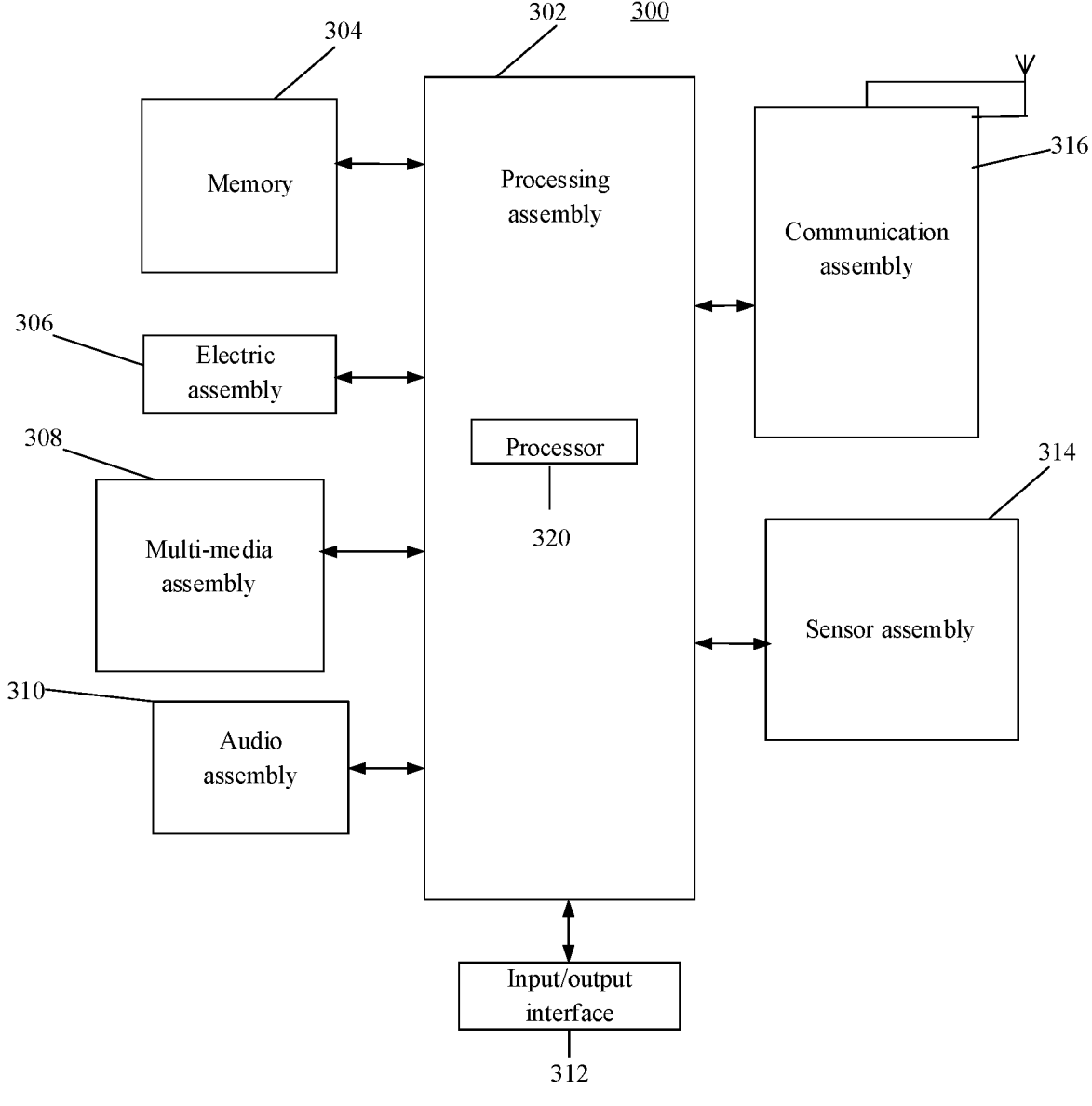
FIG. 14 is a block diagram of an apparatus used for communication shown according to an example.

FIG. 14 is a block diagram of an apparatus used for communication 300 shown according to an example. For instance, the apparatus 300 may be a mobile phone, a computer, a digital broadcasting terminal, a message receiving and transmitting device, a game console, a tablet device, a medical device, a fitness device, a personal digital assistant, etc.

With reference to FIG. 14, the apparatus 300 may include one or more of assemblies as follows: a processing assembly 302, a memory 304, an electric assembly 306, a multi-media assembly 308, an audio assembly 310, an input/output (I/O) interface 312, a sensor assembly 314, and a communication assembly 316.

The processing assembly 302 generally controls the overall operation of the apparatus 300, for instance, operations associated with display, telephone call, data communication, camera operation, and recording. The processing assembly 302 may include one or more processors 320 to execute an instruction, so as to complete all steps or some steps of the above method. Further, the processing assembly 302 may include one or more modules, so as to facilitate interaction between the processing assembly 302 and other assemblies. For instance, the processing assembly 302 may include a multi-media module, so as to facilitate interaction between the multi-media assembly 308 and the processing assembly 302.

The memory 304 is configured to store various types of data, so as to support operations at the apparatus 300. Instances of such data include instructions used for any application or method operating on the apparatus 300, contact data, phonebook data, messages, pictures, videos, etc. The memory 304 may be implemented by any type of volatile or non-volatile storage devices or their combinations, such as a static random-access memory (SRAM), an electrically erasable programmable read-only memory (EE-PROM), an erasable programmable read-only memory (EPROM), a programmable read-only memory (PROM), a read-only memory (ROM), a magnetic memory, a flash memory, a magnetic disk or an optical disk.

The electric assembly 306 provides power for various assemblies of the apparatus 300. The electric assembly 306 may include a power source management system, one or more power sources, and other assemblies associated with the generation, management, and power distribution of the apparatus 300.

The multi-media assembly 308 includes a screen that provides an output interface between the apparatus 300 and a user. In some examples, the screen may include a liquid crystal display (LCD) and a touch panel (TP). If the screen includes a touch panel, the screen may be implemented as a touch screen, so as to receive an input signal from a user. The touch panel includes one or more touch sensors, so as to sense touches, swipes, and gestures on the touch panel. The touch sensor may not only sense a boundary of a touch or swipe, but also detect time and pressure associated with the touch or swipe. In some examples, the multi-media assembly 308 includes a front facing camera and/or a rear facing camera. When the apparatus 300 is in an operation mode, for instance, a photographing mode or a video mode, the front facing camera and/or the rear facing camera may receive external multi-media data. Each of the front facing camera and the rear facing camera may be a fixed optical lens system or have focusing and optical zooming capabilities.

The audio assembly 310 is configured to output and/or input audio signals. For instance, the audio assembly 310 may include a microphone (MIC) that is configured to receive external audio signals when the apparatus 300 is in an operation mode, for instance, a call mode, a recording mode, or a voice recognition mode. The received audio signals may be further stored in the memory 304 or transmitted by means of the communication assembly 316. In some examples, the audio assembly 310 further includes a loudspeaker used for outputting the audio signals.

The I/O interface 312 provides an interface between the processing assembly 302 and peripheral interface modules, for instance, keyboards, click wheels, and buttons. These buttons may include, but are not limited to, a home button, a volume button, a start button, and a lock button.

The sensor assembly 314 may include one or more sensors used for providing a status assessment of various aspects of the apparatus 300. For instance, the sensor assembly 314 may detect an open/closed state of the apparatus 300, and relative positioning of assemblies, which are, for instance, a display and a keypad of the apparatus 300. The sensor assembly 314 may further detect a change in position of the apparatus 300 or an assembly of the apparatus 300, presence or absence of contact between a user and the apparatus 300, orientation or acceleration/deceleration of the apparatus 300, and a temperature change of the apparatus 300. The sensor assembly 314 may include a proximity sensor configured to detect the presence of a nearby object in the absence of any physical contact. The sensor assembly 314 may further include a light sensor, such as a complementary metal oxide semiconductor (CMOS) or charge coupled device (CCD) image sensor, which is used in imaging application. In some examples, the sensor assembly 314 may further include an acceleration sensor, a gyroscopic sensor, a magnetic sensor, a pressure sensor, or a temperature sensor.

The communication assembly 316 is configured to facilitate wired or wireless communication between the apparatus 300 and other devices. The apparatus 300 may access a wireless network based on a communication standard, such as Wi-Fi, 2G, 3G, or their combination. In an example, the communication assembly 316 receives a broadcast signal or broadcast related information from an external broadcast management system by a broadcast channel. In an example, the communication assembly 316 further includes a near-field communication (NFC) module, so as to facilitate short-range communication. For instance, the NFC module may be implemented on the basis of a radio frequency identification (RFID) technology, an infrared data association (IrDA) technology, an ultra wideband (UWB) technology, a Bluetooth (BT) technology, and other technologies.

In an example, the apparatus 300 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic elements, so as to be used for executing the above methods.

An example further provides a non-transitory computer-readable storage medium including an instruction, for instance, a memory 304 including an instruction, and the above instruction may be executed by the processor 320 of the apparatus 300, so as to implement the above method. For instance, the non-transitory computer-readable storage medium may be a ROM, a random access memory (RAM), a compact disc read-only memory (CD-ROM), a magnetic tape, a floppy disk, an optical data storage device, etc.

Figure 15:
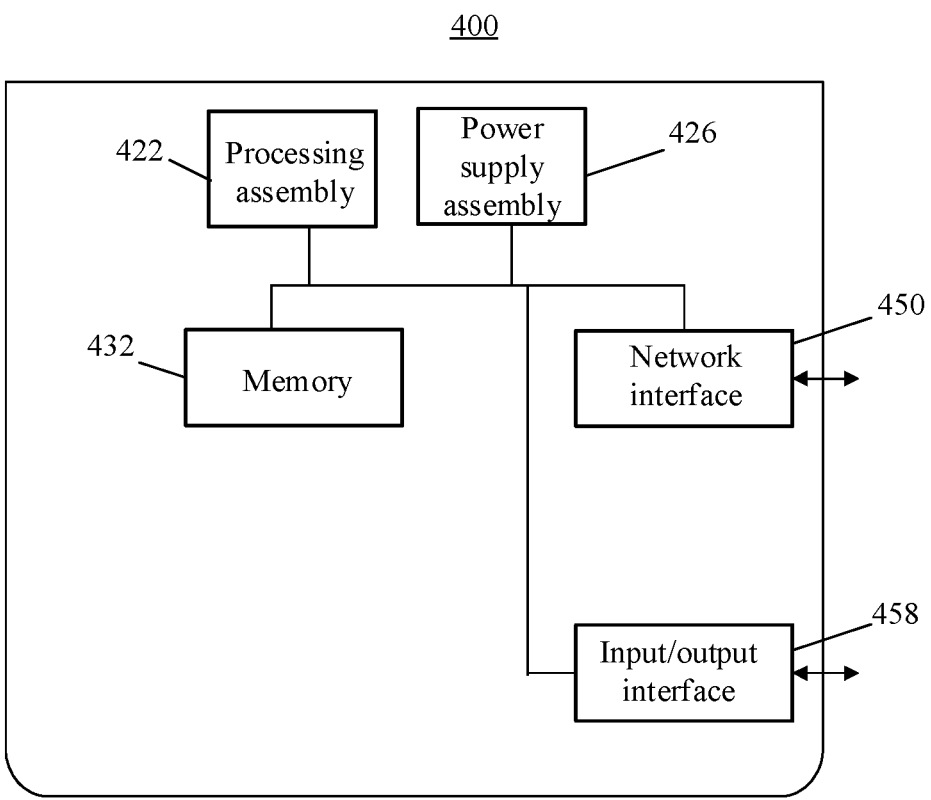
FIG. 15 is a block diagram of an apparatus used for communication shown according to an example.

FIG. 15 is a block diagram of an apparatus used for communication 400, shown according to an example. For instance, the apparatus 400 may be provided as a network device. With reference to FIG. 15, the apparatus 400 includes a processing assembly 422, and the processing assembly 422 further includes one or more processors (not shown), and memory resources represented by the memory 432, which are used for storing an instruction that may be executed by the processing assembly 422, such as an application. The application stored in the memory 432 may include one or more modules that each correspond to a set of instructions. In addition, the processing assembly 422 is configured to execute an instruction, so as to execute the above method.

The apparatus 400 may further include a power supply assembly 426 configured to execute power source management of the apparatus 400, a wired or wireless network interface 450 configured to connect the apparatus 400 with a network, and an input/output (I/O) interface 458. The apparatus 400 may operate an operating system stored in the memory 432, such as Windows Server™, Mac OS X™, Unix™, Linux™, FreeBSD™, and similar systems.

An example further provides a non-transitory computer-readable storage medium including an instruction, for instance, a memory 432 including an instruction, and the above instruction may be executed by the processing assembly 422 of the apparatus 400, so as to implement the above method. For instance, the non-transitory computer-readable storage medium may be a ROM, a RAM, a CD-ROM, a magnetic tape, a floppy disk, an optical data storage device, etc.

It can be further understood that the term "plurality" in the disclosure refers to two or more, and other quantifiers are understood in a similar way. The term "and/or" describing an association relation between associated objects indicates that there can be three relations. For instance, A and/or B can represent A alone, both A and B, and B alone. Character "/" generally indicates that associated objects in the context are in an "or" relation. Singular forms, for instance, "a", "the", and "this" are also intended to include plural forms, unless otherwise clearly stated in the context.

It can be further understood that terms "first", "second", etc. are used for describing various information, but such information should not be limited by these terms. These terms are merely used to distinguish the same type of information from each other, and do not denote any specific order or importance. In fact, expressions "first", "second", etc. can be used interchangeably. For instance, first information can also be referred to as second information, and similarly, second information can also be referred to as first information, without departing from the scope of the disclosure.

It can be further understood that although operations are described in specific order in accompanying drawings in examples of the disclosure, it should not be understood that these operations are required to be executed in the shown specific order or in serial order, or that all illustrated operations are required to be executed so as to achieve the expected results. In specific circumstances, multitasking and parallel processing may be advantageous.

Those skilled in the art could readily conceive of other implementation solutions of the disclosure upon consideration of the description and the invention disclosed in the implementation. The disclosure is intended to cover any variations, uses, or adaptive changes of the disclosure, which follow the general principles of the disclosure and include common general knowledge or customary technical means in the art that are not disclosed in the disclosure. The description and examples are to be regarded as illustrative merely, and the true scope and spirit of the disclosure are indicated by the following claims.

It should be understood that the disclosure is not limited to a precise structure that is described above and illustrated in the accompanying drawings, and can have various modifications and changes without departing from the scope of the disclosure. The scope of the disclosure is limited by the appended claims merely.

According to a first aspect of an example of the disclosure, a communication method is provided. The communication method is performed by a terminal and includes: determining first information, where the first information is used for indicating a hybrid automatic repeat request process used for receiving a multicast broadcast service or the first information is used for indicating that the multicast broadcast service is received without the hybrid automatic repeat request process; and receiving the multicast broadcast service on the basis of the first information.

In an embodiment, the determining first information includes: determining a dedicated corresponding relation configured for the terminal, where the dedicated corresponding relation is a corresponding relation between a value of a hybrid automatic repeat request process number field and a hybrid automatic repeat request process number; and the receiving the multicast broadcast service on the basis of the first information includes: determining, on the basis of the first information, a first hybrid automatic repeat request process number for scheduling a first multicast broadcast service, where the first hybrid automatic repeat request process number is a hybrid automatic repeat request process number of the terminal corresponding to the value of the hybrid automatic repeat request process number field in scheduling signaling; and receiving the first multicast broadcast service with a hybrid automatic repeat request process indicated by the first hybrid automatic repeat request process number.

In an embodiment, different terminals have different dedicated corresponding relations.

In an embodiment, the determining first information includes: determining that the multicast broadcast service is scheduled without the hybrid automatic repeat request process, where the multicast broadcast service is scheduled without the hybrid automatic repeat request process includes: a physical downlink control channel for scheduling the multicast broadcast service does not use the hybrid automatic repeat request process, or a semi-persistent scheduling for scheduling the multicast broadcast service does not use the hybrid automatic repeat request process.

In an embodiment, receiving the multicast broadcast service includes: receiving the multicast broadcast service without the hybrid automatic repeat request process.

In an embodiment, determining that the multicast broadcast service is scheduled without the hybrid automatic repeat request process includes: determining, in response to determining that a bit of the hybrid automatic repeat request process number field in scheduling signaling for scheduling the multicast broadcast service is a reserved bit, that the multicast broadcast service is scheduled without the hybrid automatic repeat request process.

In an embodiment, the determining first information includes: determining that one or more multicast broadcast services are scheduled with a designated hybrid automatic repeat request process; and the receiving the multicast broadcast service on the basis of the first information includes: receiving the multicast broadcast service with the designated hybrid automatic repeat request process in response to determining that a to-be-received multicast broadcast service is scheduled with the designated hybrid automatic repeat request process.

In an embodiment, the designated hybrid automatic repeat request process is different from a hybrid automatic repeat request process for scheduling a unicast service.

In an embodiment, the determining first information includes: determining that hybrid automatic repeat request processes used for a plurality of different multicast broadcast services are the same.

In an embodiment, the receiving the multicast broadcast service includes: receiving the multicast broadcast service through at least one of methods: receiving a multicast broadcast service having highest priority with the hybrid automatic repeat request process on the basis of priority of receiving the plurality of different multicast broadcast services; taking, in response to determining that multicast broadcast service data received and buffered with the hybrid automatic repeat request process is not successfully decoded, the hybrid automatic repeat request process as a hybrid automatic repeat request process used for a multicast broadcast service that is not successfully decoded, and neglecting other multicast broadcast services of the plurality of multicast broadcast services different from the multicast broadcast service that is not successfully decoded; or starting, in response to determining that a designated multicast broadcast service is received, a hybrid automatic repeat request process occupation timer for the hybrid automatic repeat request process used for the designated multicast broadcast service, and neglecting other multicast broadcast services of the plurality of multicast broadcast services different from the designated multicast broadcast service.

In an embodiment, the communication method further includes: transmitting data reception state feedback information in response to determining that first multicast broadcast service data stored in a hybrid automatic repeat request buffer for buffering the multicast broadcast service data is covered with second multicast broadcast service data, where the data reception state feedback information indicates that the first multicast broadcast service data is successfully decoded, or not transmitting reception state feedback information of the first multicast broadcast service data.

In an embodiment, the communication method further includes: transmitting data reception state feedback information that indicates decoding failure for other neglected multicast broadcast services.

In an embodiment, the hybrid automatic repeat request process occupation timer is started according to at least one of cases: after multicast broadcast service (MBS) data of the designated multicast broadcast service is received, the hybrid automatic repeat request process occupation timer is started; after the MBS data of the designated multicast broadcast service is received, and in a case that the MBS data is not successfully decoded, the hybrid automatic repeat request process occupation timer is started; after the MBS data of the designated multicast broadcast service is received and feedback information of the MBS data is transmitted, the hybrid automatic repeat request process occupation timer is started; or after the MBS data of the designated multicast broadcast service is received and the feedback information of the MBS data is transmitted, and in a case that the feedback information is not successfully decoded, the hybrid automatic repeat request process occupation timer is started.

In an embodiment, the communication method further includes: stopping the hybrid automatic repeat request process occupation timer according to at least one of cases: a multicast broadcast service having higher priority than the designated multicast broadcast service is received; MBS data of the designated multicast broadcast service is successfully decoded; or the MBS data of the designated multicast broadcast service is successfully decoded, and feedback information of the MBS data is transmitted.

According to a second aspect of an example of the disclosure, a communication method is provided. The communication method is performed by a network device and includes: determining first information, where the first information is used for indicating a hybrid automatic repeat request process used for receiving a multicast broadcast service or the first information is used for indicating that the multicast broadcast service is received without the hybrid automatic repeat request process; and transmitting the first information.

In an embodiment, the determining first information includes: determining a dedicated corresponding relation configured for a terminal, where the dedicated corresponding relation is a corresponding relation between a value of a hybrid automatic repeat request process number field and a hybrid automatic repeat request process number.

In an embodiment, different terminals have different dedicated corresponding relations.

In an embodiment, the determining first information includes: determining that the multicast broadcast service is scheduled without the hybrid automatic repeat request process, where the multicast broadcast service is scheduled without the hybrid automatic repeat request process includes: a physical downlink control channel for scheduling the multicast broadcast service does not use the hybrid automatic repeat request process, or a semi-persistent scheduling for scheduling the multicast broadcast service does not use the hybrid automatic repeat request process.

In an embodiment, a bit of the hybrid automatic repeat request process number field in scheduling signaling for scheduling the multicast broadcast service is a reserved bit.

In an embodiment, the determining first information includes: determining that one or more multicast broadcast services are scheduled with a designated hybrid automatic repeat request process.

In an embodiment, the designated hybrid automatic repeat request process is different from a hybrid automatic repeat request process for scheduling a unicast service.

In an embodiment, the determining first information includes: determining that hybrid automatic repeat request processes used for a plurality of different multicast broadcast services are the same.

According to a third aspect of an example of the disclosure, a communication apparatus is provided. The communication apparatus is performed by a terminal and includes: a processing unit configured to determine first information, where the first information is used for indicating a hybrid automatic repeat request process used for receiving a multicast broadcast service or the first information is used for indicating that the multicast broadcast service is received without the hybrid automatic repeat request process; and a receiving unit configured to receive the multicast broadcast service on the basis of the first information.

In an embodiment, the processing unit determines the first information through a method as follows: determining a dedicated corresponding relation configured for the terminal, where the dedicated corresponding relation is a corresponding relation between a value of a hybrid automatic repeat request process number field and a hybrid automatic repeat request process number.

The receiving unit receives the multicast broadcast service on the basis of the first information through a method as follows: determining, on the basis of the first information, a first hybrid automatic repeat request process number for scheduling a first multicast broadcast service, where the first hybrid automatic repeat request process number is a hybrid automatic repeat request process number of the terminal corresponding to the value of the hybrid automatic repeat request process number field in scheduling signaling; and receiving the first multicast broadcast service with a hybrid automatic repeat request process indicated by the first hybrid automatic repeat request process number.

In an embodiment, different terminals have different dedicated corresponding relations.

In an embodiment, the processing unit determines the first information through a method as follows: determining that the multicast broadcast service is scheduled without the hybrid automatic repeat request process, where the multicast broadcast service is scheduled without the hybrid automatic repeat request process includes: a physical downlink control channel for scheduling the multicast broadcast service does not use the hybrid automatic repeat request process, or a semi-persistent scheduling for scheduling the multicast broadcast service does not use the hybrid automatic repeat request process.

The receiving unit receives the multicast broadcast service through a method as follows: receiving the multicast broadcast service without the hybrid automatic repeat request process.

In an embodiment, the processing unit determines that the multicast broadcast service is scheduled without the hybrid automatic repeat request process through a method as follows: determining, in response to determining that a bit of the hybrid automatic repeat request process number field in scheduling signaling for scheduling the multicast broadcast service is a reserved bit, that the multicast broadcast service is scheduled without the hybrid automatic repeat request process.

In an embodiment, the processing unit determines the first information through a method as follows: determining that one or more multicast broadcast services are scheduled with a designated hybrid automatic repeat request process.

The receiving unit receives the multicast broadcast service on the basis of the first information through a method as follows: receiving the multicast broadcast service with the designated hybrid automatic repeat request process in response to determining that a to-be-received multicast broadcast service is scheduled with the designated hybrid automatic repeat request process.

In an embodiment, the designated hybrid automatic repeat request process is different from a hybrid automatic repeat request process for scheduling a unicast service.

In an embodiment, the processing unit determines the first information through a method as follows: determining that hybrid automatic repeat request processes used for a plurality of different multicast broadcast services are the same.

In an embodiment, the receiving unit receives the multicast broadcast service through at least one of methods: receiving a multicast broadcast service having highest priority with the hybrid automatic repeat request process on the basis of priority of receiving the plurality of different multicast broadcast services; taking, in response to determining that multicast broadcast service data received and buffered with the hybrid automatic repeat request process is not successfully decoded, the hybrid automatic repeat request process as a hybrid automatic repeat request process used for a multicast broadcast service that is not successfully decoded, and neglecting other multicast broadcast services of the plurality of multicast broadcast services different from the multicast broadcast service that is not successfully decoded; or starting, in response to determining that a designated multicast broadcast service is received, a hybrid automatic repeat request process occupation timer for the hybrid automatic repeat request process used for the designated multicast broadcast service, and neglecting other multicast broadcast services of the plurality of multicast broadcast services different from the designated multicast broadcast service.

In an embodiment, the communication apparatus further includes a transmitting unit. The transmitting unit is configured to: transmit data reception state feedback information in response to determining that first multicast broadcast service data stored in a hybrid automatic repeat request buffer for buffering the multicast broadcast service data is covered with second multicast broadcast service data, where the data reception state feedback information indicates that the first multicast broadcast service data is successfully decoded, or not transmit reception state feedback information of the first multicast broadcast service data.

In an embodiment, the communication apparatus further includes a transmitting unit. The transmitting unit is configured to: transmit data reception state feedback information that indicates decoding failure for other neglected multicast broadcast services.

In an embodiment, the hybrid automatic repeat request process occupation timer is started according to at least one of cases: after MBS data of the designated multicast broadcast service is received, the hybrid automatic repeat request process occupation timer is started; after the MBS data of the designated multicast broadcast service is received, and in a case that the MBS data is not successfully decoded, the hybrid automatic repeat request process occupation timer is started; after the MBS data of the designated multicast broadcast service is received and feedback information of the MBS data is transmitted, the hybrid automatic repeat request process occupation timer is started; or after the MBS data of the designated multicast broadcast service is received and the feedback information of the MBS data is transmitted, and in a case that the feedback information is not successfully decoded, the hybrid automatic repeat request process occupation timer is started.

In an embodiment, the receiving unit is further configured to stop the hybrid automatic repeat request process occupation timer according to at least one of cases: a multicast broadcast service having higher priority than the designated multicast broadcast service is received; MBS data of the designated multicast broadcast service is successfully decoded; or the MBS data of the designated multicast broadcast service is successfully decoded, and feedback information of the MBS data is transmitted.

According to a fourth aspect of an example of the disclosure, a communication apparatus is provided. The communication apparatus is performed by a network device and includes: a processing unit configured to determine first information, where the first information is used for indicating a hybrid automatic repeat request process used for receiving a multicast broadcast service or the first information is used for indicating that the multicast broadcast service is received without the hybrid automatic repeat request process; and a transmitting unit configured to transmit the first information.

In an embodiment, the processing unit determines the first information through a method as follows: determining a dedicated corresponding relation configured for the terminal, where the dedicated corresponding relation is a corresponding relation between a value of a hybrid automatic repeat request process number field and a hybrid automatic repeat request process number.

In an embodiment, different terminals have different dedicated corresponding relations.

In an embodiment, the processing unit determines the first information through a method as follows: determining that the multicast broadcast service is scheduled without the hybrid automatic repeat request process, where the multicast broadcast service is scheduled without the hybrid automatic repeat request process includes: a physical downlink control channel for scheduling the multicast broadcast service does not use the hybrid automatic repeat request process, or a semi-persistent scheduling for scheduling the multicast broadcast service does not use the hybrid automatic repeat request process.

In an embodiment, a bit of the hybrid automatic repeat request process number field in scheduling signaling for scheduling the multicast broadcast service is a reserved bit.

In an embodiment, the processing unit determines the first information through a method as follows: determining that one or more multicast broadcast services are scheduled with a designated hybrid automatic repeat request process.

In an embodiment, the designated hybrid automatic repeat request process is different from a hybrid automatic repeat request process for scheduling a unicast service.

In an embodiment, the processing unit determines the first information through a method as follows: determining that hybrid automatic repeat request processes used for a plurality of different multicast broadcast services are the same.

According to a fifth aspect of an example of the disclosure, a communication apparatus is provided. The communication apparatus includes: a processor; and a memory used for storing a processor-executable instruction; where the processor is configured to execute the communication method in the first aspect or any embodiment of the first aspect.

According to a sixth aspect of an example of the disclosure, a communication apparatus is provided. The communication apparatus includes: a processor; and a memory used for storing a processor-executable instruction; where the processor is configured to execute the communication method in the second aspect or any embodiment of the second aspect.

According to a seventh aspect of an example of the disclosure, a non-transitory computer-readable storage medium is provided. An instruction in the storage medium enables a mobile terminal to execute the communication method in the first aspect or any embodiment of the first aspect when executed by a processor.

According to an eighth aspect of an example of the disclosure, a non-transitory computer-readable storage medium is provided. An instruction in the storage medium enables a network device to execute the communication method in the second aspect or any embodiment of the second aspect when executed by a processor.

What is claimed is:

1. A communication method, performed by a terminal and comprising:

determining first information, wherein the first information is used for indicating a hybrid automatic repeat request process used for receiving a multicast broadcast service or the first information is used for indicating that the multicast broadcast service is received without the hybrid automatic repeat request process; and receiving the multicast broadcast service based on the first information;

wherein determining the first information comprises:

determining that hybrid automatic repeat request processes used for a plurality of different multicast broadcast services are the same; and receiving the multicast broadcast service comprises receiving the multicast broadcast service through at least one of methods:

receiving a multicast broadcast service having highest priority with the hybrid automatic repeat request process based on priority of receiving the plurality of different multicast broadcast services, taking, in response to determining that multicast broadcast service data received and buffered with the hybrid automatic repeat request process is not successfully decoded, the hybrid automatic repeat request process as a hybrid automatic repeat request process used for a multicast broadcast service that is not successfully decoded, and neglecting other multicast broadcast services of the plurality of multicast broadcast services different from the multicast broadcast service that is not successfully decoded, or starting, in response to determining that a designated multicast broadcast service is received, a hybrid automatic repeat request process occupation timer for a hybrid automatic repeat request process used for the designated multicast broadcast service, and neglecting other multicast broadcast services of the plurality of multicast broadcast services different from the designated multicast broadcast service;

wherein the communication method further comprising:

transmitting data reception state feedback information in response to determining that first multicast broadcast service data stored in a hybrid automatic repeat request buffer for buffering the multicast broadcast service data is covered with second multicast broadcast service data, wherein the data reception state feedback information indicates that the first multicast broadcast service data is successfully decoded, or not transmitting reception state feedback information of the first multicast broadcast service data.

2. The communication method according to claim 1, wherein determining the first information comprises:

determining a dedicated corresponding relation configured for the terminal, wherein the dedicated corresponding relation is a corresponding relation between a value of a hybrid automatic repeat request process number field and a hybrid automatic repeat request process number; and receiving the multicast broadcast service based on the first information comprises:

determining, based on the first information, a first hybrid automatic repeat request process number for scheduling a first multicast broadcast service, wherein the first hybrid automatic repeat request process number is a hybrid automatic repeat request process number of the terminal corresponding to the value of the hybrid automatic repeat request process number field in scheduling signaling, and receiving the first multicast broadcast service with a hybrid automatic repeat request process indicated by the first hybrid automatic repeat request process number, and different terminals have different dedicated corresponding relations.

3. The communication method according to claim 1, wherein determining first information comprises:

determining that the multicast broadcast service is scheduled without the hybrid automatic repeat request process, wherein the multicast broadcast service is scheduled without the hybrid automatic repeat request process comprises: a physical downlink control channel for scheduling the multicast broadcast service does not use the hybrid automatic repeat request process, or a semi-persistent scheduling for scheduling the multicast broadcast service does not use the hybrid automatic repeat request process; and the receiving the multicast broadcast service comprises:

receiving the multicast broadcast service without the hybrid automatic repeat request process.

4. The communication method according to claim 3, wherein determining that the multicast broadcast service is scheduled without the hybrid automatic repeat request process comprises:

determining, in response to determining that a bit of the hybrid automatic repeat request process number field in scheduling signaling for scheduling the multicast broadcast service is a reserved bit, that the multicast broadcast service is scheduled without the hybrid automatic repeat request process.

5. The communication method according to claim 1, wherein determining the first information comprises:

determining that one or more multicast broadcast services are scheduled with a designated hybrid automatic repeat request process; and receiving the multicast broadcast service based on the first information comprises:

receiving the multicast broadcast service with the designated hybrid automatic repeat request process in response to determining that a to-be-received multicast broadcast service is scheduled with the designated hybrid automatic repeat request process.

6. The communication method according to claim 5, wherein the designated hybrid automatic repeat request process is different from a hybrid automatic repeat request process for scheduling a unicast service.

7. The communication method according to claim 1, further comprising:

transmitting the data reception state feedback information that indicates decoding failure for other neglected multicast broadcast services.

8. The communication method according to claim 1, wherein the hybrid automatic repeat request process occupation timer is started according to at least one of cases:

after multicast broadcast service (MBS) data of the designated multicast broadcast service is received, the hybrid automatic repeat request process occupation timer is started;

after the MBS data of the designated multicast broadcast service is received, and in a case that the MBS data is not successfully decoded, the hybrid automatic repeat request process occupation timer is started;

after the MBS data of the designated multicast broadcast service is received and feedback information of the MBS data is transmitted, the hybrid automatic repeat request process occupation timer is started; or after the MBS data of the designated multicast broadcast service is received and the feedback information of the MBS data is transmitted, and in a case that the feedback information is not successfully decoded, the hybrid automatic repeat request process occupation timer is started.

9. The communication method according to claim 1, further comprising:

stopping the hybrid automatic repeat request process occupation timer according to at least one of cases:

a multicast broadcast service having higher priority than the designated multicast broadcast service is received;

MBS data of the designated multicast broadcast service is successfully decoded; or the MBS data of the designated multicast broadcast service is successfully decoded, and feedback information of the MBS data is transmitted.

10. A communication method, performed by a network device and comprising:

determining first information, wherein the first information is used for indicating a hybrid automatic repeat request process used for receiving a multicast broadcast service or the first information is used for indicating that the multicast broadcast service is received without the hybrid automatic repeat request process; and transmitting the first information;

wherein determining the first information comprises:

determining that hybrid automatic repeat request processes used for a plurality of different multicast broadcast services are the same;

wherein the first information is configured to enable a terminal to:

receive the multicast broadcast service through at least one of methods:

receiving a multicast broadcast service having highest priority with the hybrid automatic repeat request process based on priority of receiving the plurality of different multicast broadcast services, taking, in response to determining that multicast broadcast service data received and buffered with the hybrid automatic repeat request process is not successfully decoded, the hybrid automatic repeat request process as a hybrid automatic repeat request process used for a multicast broadcast service that is not successfully decoded, and neglecting other multicast broadcast services of the plurality of multicast broadcast services different from the multicast broadcast service that is not successfully decoded, or starting, in response to determining that a designated multicast broadcast service is received, a hybrid automatic repeat request process occupation timer for a hybrid automatic repeat request process used for the designated multicast broadcast service, and neglecting other multicast broadcast services of the plurality of multicast broadcast services different from the designated multicast broadcast service;

transmit data reception state feedback information in response to determining that first multicast broadcast service data stored in a hybrid automatic repeat request buffer for buffering the multicast broadcast service data is covered with second multicast broadcast service data, wherein the data reception state feedback information indicates that the first multicast broadcast service data is successfully decoded, or not transmitting reception state feedback information of the first multicast broadcast service data.

11. The communication method according to claim 10, wherein determining the first information comprises:

determining a dedicated corresponding relation configured for the terminal, wherein the dedicated corresponding relation is a corresponding relation between a value of a hybrid automatic repeat request process number field and a hybrid automatic repeat request process number, and different terminals have different dedicated corresponding relations.

12. The communication method according to claim 10, wherein determining the first information comprises:

determining that the multicast broadcast service is scheduled without the hybrid automatic repeat request process, wherein the multicast broadcast service is scheduled without the hybrid automatic repeat request process comprises: a physical downlink control channel for scheduling the multicast broadcast service does not use the hybrid automatic repeat request process, or a semi-persistent scheduling for scheduling the multicast broadcast service does not use the hybrid automatic repeat request process.

13. The communication method according to claim 12, wherein a bit of the hybrid automatic repeat request process number field in scheduling signaling for scheduling the multicast broadcast service is a reserved bit.

14. The communication method according to claim 10, wherein determining the first information comprises:

determining that one or more multicast broadcast services are scheduled with a designated hybrid automatic repeat request process.

15. The communication method according to claim 14, wherein the designated hybrid automatic repeat request process is different from a hybrid automatic repeat request process for scheduling a unicast service.

16. A communication apparatus, comprising:

a processor; and a memory used for storing a processor-executable instruction;

wherein the processor is configured to:

determine first information, wherein the first information is used for indicating a hybrid automatic repeat request process used for receiving a multicast broadcast service or the first information is used for indicating that the multicast broadcast service is received without the hybrid automatic repeat request process; and receive the multicast broadcast service based on the first information;

wherein the processor is further configured to:

determine that hybrid automatic repeat request processes used for a plurality of different multicast broadcast services are the same; and receive the multicast broadcast service through at least one of methods:

receiving a multicast broadcast service having highest priority with the hybrid automatic repeat request process based on priority of receiving the plurality of different multicast broadcast services, taking, in response to determining that multicast broadcast service data received and buffered with the hybrid automatic repeat request process is not successfully decoded, the hybrid automatic repeat request process as a hybrid automatic repeat request process used for a multicast broadcast service that is not successfully decoded, and neglecting other multicast broadcast services of the plurality of multicast broadcast services different from the multicast broadcast service that is not successfully decoded, or starting, in response to determining that a designated multicast broadcast service is received, a hybrid automatic repeat request process occupation timer for a hybrid automatic repeat request process used for the designated multicast broadcast service, and neglecting other multicast broadcast services of the plurality of multicast broadcast services different from the designated multicast broadcast service;

transmit data reception state feedback information in response to determining that first multicast broadcast service data stored in a hybrid automatic repeat request buffer for buffering the multicast broadcast service data is covered with second multicast broadcast service data, wherein the data reception state feedback information indicates that the first multicast broadcast service data is successfully decoded, or not transmitting reception state feedback information of the first multicast broadcast service data.

17. A non-transitory computer-readable storage medium, wherein an instruction in the non-transitory computer-readable storage medium enables a mobile terminal to execute the communication method of claim 1 when executed by a processor.

* * * * *